United States Patent
Honda

(10) Patent No.: US 7,310,575 B2
(45) Date of Patent: Dec. 18, 2007

(54) APPARATUS FOR PROCESSING SENSOR SIGNAL FROM KNOCK SENSOR OF INTERNAL COMBUSTION ENGINE

(75) Inventor: Takayoshi Honda, Kariya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/643,933

(22) Filed: Dec. 22, 2006

(65) Prior Publication Data

US 2007/0179756 A1 Aug. 2, 2007

(30) Foreign Application Priority Data

Dec. 26, 2005 (JP) ............... 2005-373207

(51) Int. Cl.
G06F 19/00 (2006.01)
F02M 7/00 (2006.01)

(52) U.S. Cl. .................. 701/111; 123/435; 123/406.21; 341/118

(58) Field of Classification Search ................ 701/111, 701/112, 114, 115; 123/434, 435, 406.21, 123/406.29, 406.34, 406.39; 341/157, 155, 341/118, 120
See application file for complete search history.

(56) References Cited

U.S. PATENT DOCUMENTS

| | | | | |
|---|---|---|---|---|
| 4,356,551 A | * | 10/1982 | Iwase et al. ................ | 701/111 |
| 4,513,716 A | * | 4/1985 | Haraguchi et al. ..... | 123/406.36 |
| 4,711,212 A | * | 12/1987 | Haraguchi et al. ..... | 123/406.38 |
| 4,760,828 A | * | 8/1988 | Shimada et al. ....... | 123/406.21 |
| 4,969,440 A | * | 11/1990 | Murakami et al. ..... | 123/406.37 |
| 5,048,487 A | * | 9/1991 | Fujimoto ............... | 123/406.65 |
| 5,396,247 A | | 3/1995 | Watanabe et al. | |
| 5,867,115 A | | 2/1999 | Honda et al. | |
| 5,991,686 A | | 11/1999 | Oguro et al. | |
| 6,801,150 B2 | | 10/2004 | Honda | |
| 6,857,416 B2 | | 2/2005 | Honda | |
| 6,933,867 B2 | | 8/2005 | Honda | |
| 7,030,803 B2 | | 4/2006 | Harada et al. | |

FOREIGN PATENT DOCUMENTS

| | | |
|---|---|---|
| JP | S59-049351 | 3/1984 |
| JP | H05-259907 | 10/1993 |
| JP | H09-060568 | 3/1997 |
| JP | H09-126039 | 5/1997 |
| JP | H11-044250 | 2/1999 |
| JP | H11-298327 | 10/1999 |
| JP | 2000-013227 | 1/2000 |
| JP | 2003-273735 | 9/2003 |
| JP | 2004-309267 | 11/2004 |
| JP | 2005-167972 | 6/2005 |
| JP | 2005-223818 | 8/2005 |
| JP | 2005-229263 | 8/2005 |
| JP | 2006-112346 | 4/2006 |

* cited by examiner

*Primary Examiner*—John T. Kwon
(74) *Attorney, Agent, or Firm*—Nixon & Vanderhye P.C.

(57) ABSTRACT

A knock sensor signal processing apparatus for an engine, which performs a series of A/D conversions of a knock sensor signal during each of successive knock judgement intervals to obtain A/D converted values for use in judging if engine knocking is occurring in a cylinder, derives compensation coefficients during an interval between the end of a knock judgement interval corresponding to a cylinder and the start of deriving knock sensor signal A/D values in a succeeding knock judgement interval for a succeeding cylinder, and applies these coefficients to correct the A/D converted values derived in the second knock judgement interval.

19 Claims, 19 Drawing Sheets

FIG. 2A

< PROCESSING IC TO INPUT IC > cmdA (CHANNEL CHANGEOVER, GAIN CHANGEOVER, ETC.): CHANNEL | GAIN | OTHER (1) | ALL 0 cmdB (REQUEST FOR A/D CONVERTED VALUE): ALL 0

FIG. 2B

< INPUT IC TO PROCESSING IC > cmdA RESPONSE DATA (RESULT): CHANNEL | GAIN | OTHER (2) | ALL 0 cmdB RESPONSE DATA (A/D CONVERTED VALUE)

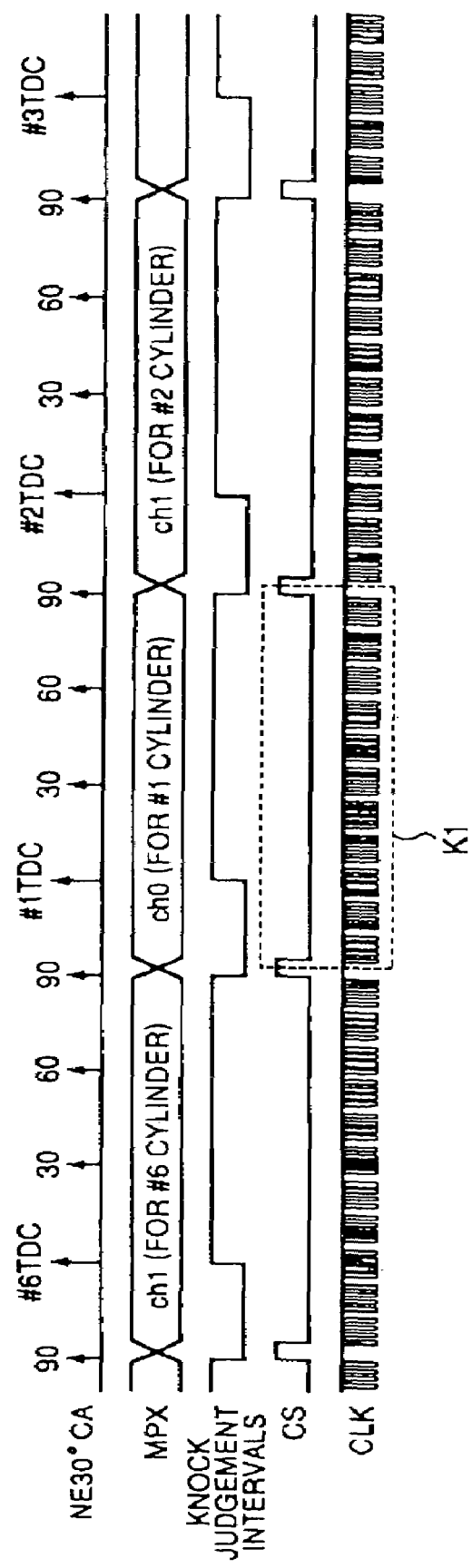

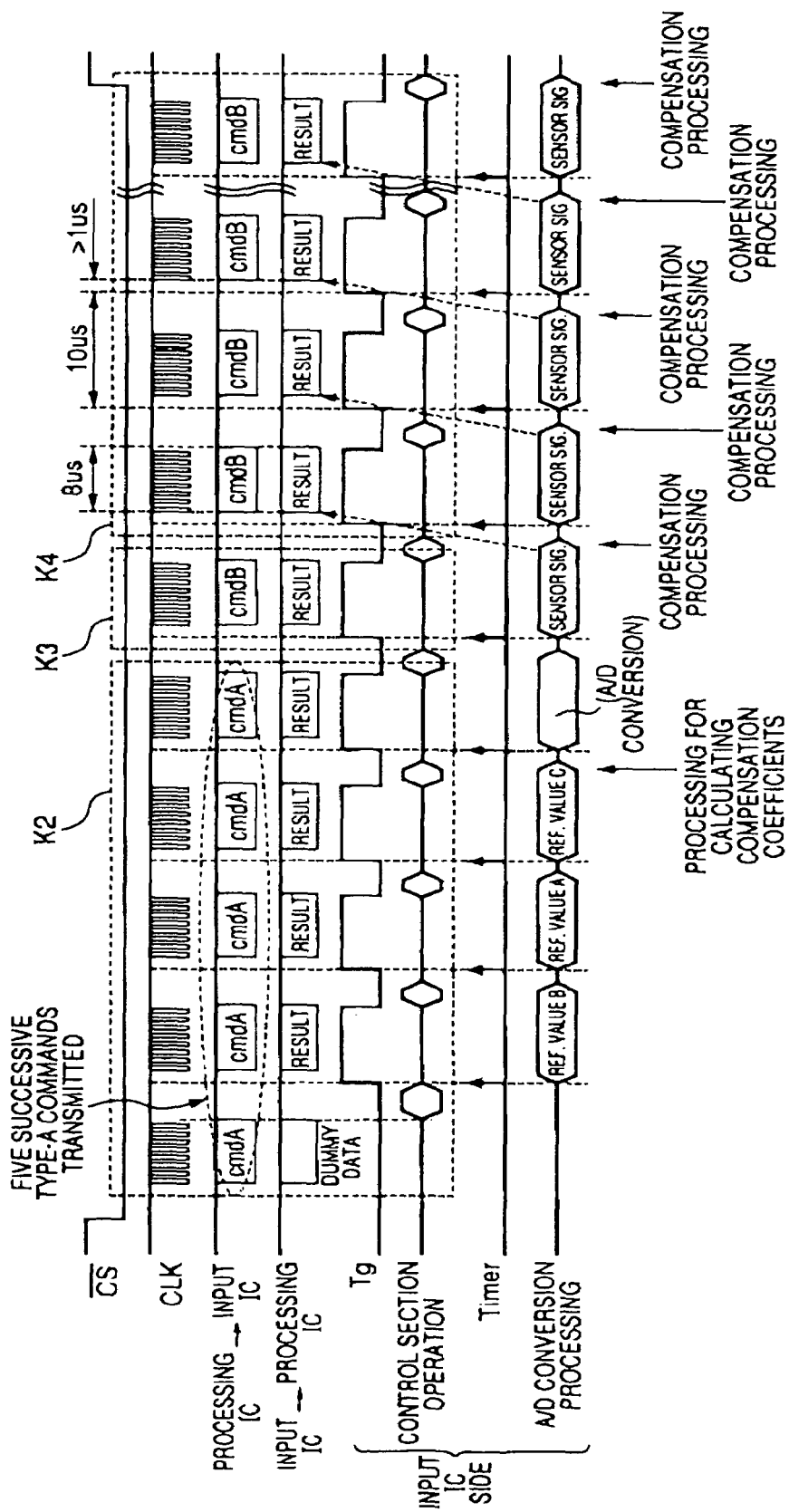

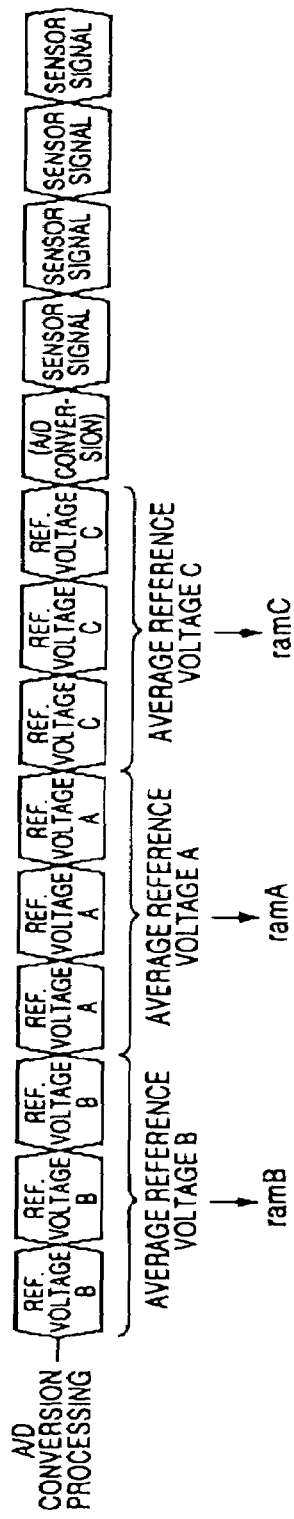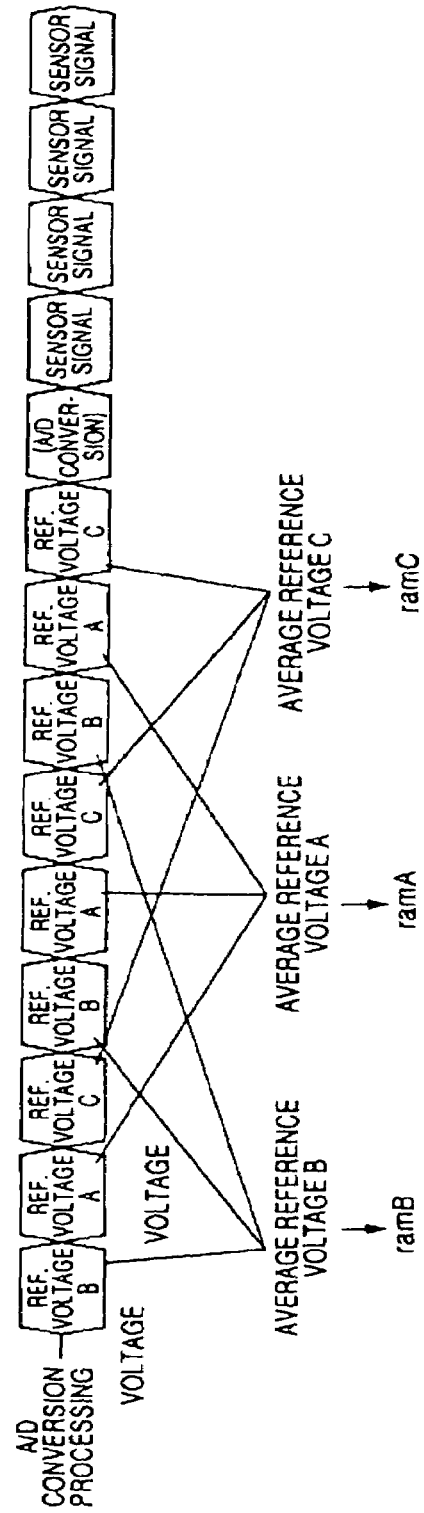

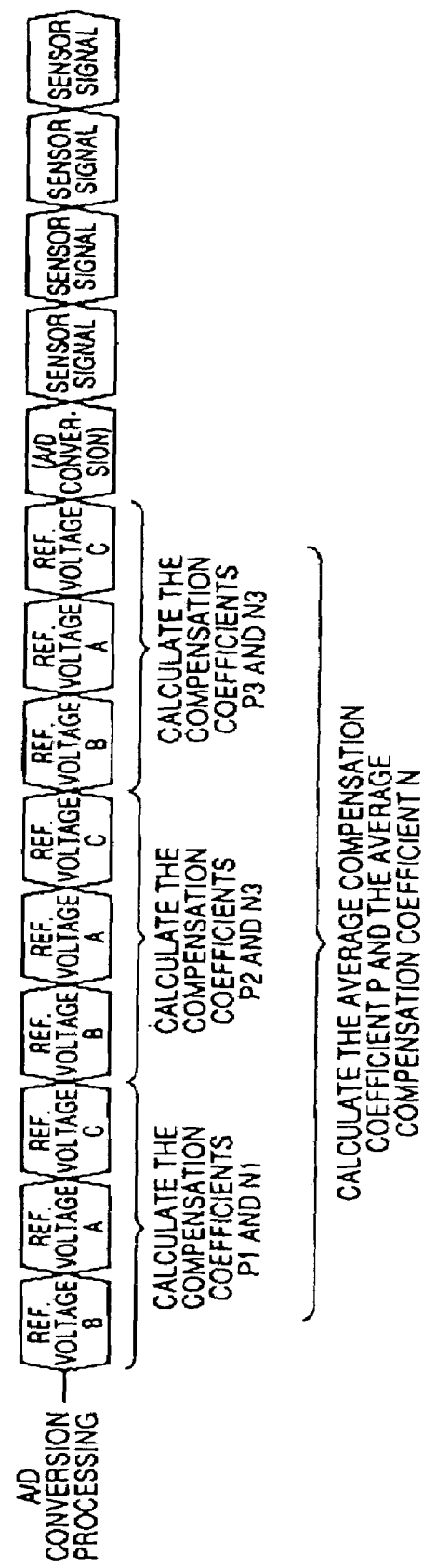

APPARATUS FOR PROCESSING SENSOR SIGNAL FROM KNOCK SENSOR OF INTERNAL COMBUSTION ENGINE

CROSS-REFERENCE TO RELATED APPLICATIONS

This application is based on and incorporates herein by reference Japanese Patent Application First Publication No. 2005-373207 filed on Dec. 26, 2005.

BACKGROUND OF THE INVENTION

1. Field of Application

The present invention relates to a knock sensor signal processing apparatus which performs A/D conversion and digital filter processing of respective sensor signals produced from one or more knock sensors of an internal combustion engine.

2. Description of Related Art

Types of apparatus are known for use in controlling the engine of a vehicle whereby during respective intervals, a judgement is made as to whether knocking is occurring in a cylinder of the engine. The judgement is based upon an analog output signal (referred to in the following as a knock sensor signal) produced from a knock sensor that is installed in the engine, with the knock sensor signal being subjected to A/D conversion at fixed periodic intervals. Digital filter processing is applied the resultant train of digital values and judgement as to whether knocking is occurring in a cylinder is made based upon the results of the digital filter processing of these digital values.

In the following description and appended claims, a digital value resulting from an A/D conversion operation is referred to simply as an "A/D value".

Such a form of knock judgement is described for example in Japanese patent first publication No. 2004-309267 (referred to in the following as reference document 1).

A signal processing apparatus for performing such A/D conversion and digital filter processing of a knock sensor signal can for example be based on a first apparatus that includes an A/D converter which operates on the knock sensor signal and a second apparatus which acquires resultant A/D values from the first apparatus at periodic fixed intervals, transmitted via a communication line, with the second apparatus performing digital filter processing of the series of sensor A/D values and knock judgement based on the filtering results. With such a system, the second apparatus may transmit commands to the first apparatus that include request commands for designating respective A/D conversions to be performed (with these commands being sent at fixed periodic intervals). Each time that the first apparatus receives such an A/D conversion request command, it transmits an A/D value obtained from the A/D converter, to the second apparatus. A/D values are thereby transmitted from the first apparatus to the second apparatus at regular intervals. Such a system has been described by the assignees of the present invention, in Japanese patent first publication No. 2006-112346.

In the case of an engine having a plurality of cylinders, it is known to provide respectively separate knock sensors for each of a plurality of sets of cylinders. When a single system is used for performing knock sensor signal A/D conversion and digital filter processing with such a plurality of knock sensors, switching can be performed between inputting the output signals from the respective knock sensors to the A/D conversion and digital filter processing system. Such a system is described for example in Japanese patent first publication No. 9-60568 (referred to in the following as reference document 2).

An A/D converter for use with such a type of knock sensor signal processing apparatus should preferably have high speed of operation combined with high resolution of A/D conversion. An example of such an A/D converter is a pulse phase difference encoder circuit, which utilizes the relationship between the supply voltage applied to each of a plurality of delay stages formed of semiconductor devices and the amount of signal transmission delay of each delay stage. With such an A/D converter, the value of an analog input voltage applied as the supply voltage can be obtained as a count of the total number of delays stages traversed by a pulse signal during a fixed interval. Such a type of A/D converter is described for example in Japanese patent first publication No. 5-259907 (referred to in the following as reference document 3) and Japanese patent first publication No. 2005-223818 (referred to in the following as reference document 4), so that detailed description is omitted.

With such a type of A/D converter, high speed of conversion and high conversion resolution can both be achieved. However the A/D conversion characteristics vary in accordance with the operating temperature of the A/D converter, due to the relationship between the delay produced by each delay stage and temperature.

Furthermore, as shown in FIG. 1 of reference document 4, the input analog voltage of such a type of A/D converter may be supplied from an amplifier, with the central voltage level of the input analog voltage being thereby set as a reference voltage VR. However in that case, if variations occur in the level of the reference voltage VR, then resultant variations will occur in the A/D conversion characteristics, causing the accuracy of the obtained A/D values to be lowered, so that accurate judgement of occurrence of knocking cannot be achieved.

SUMMARY OF THE INVENTION

It is an objective of the present invention to overcome the above problems by providing a knock sensor signal processing apparatus whereby accuracy of A/D conversion of a knock sensor signal can be achieved, and hence accurate knock judgement can be performed, irrespective of the effects of variations in operating temperature and power supply voltage upon an A/D converter which performs conversions of the knock sensor signal or upon an amplifier which supplies the knock sensor signal to the A/D converter.

To achieve the above objective, according to a first aspect the invention provides a knock sensor signal processing apparatus for a multi-cylinder internal combustion engine, with the apparatus including A/D converter control means for controlling an A/D converter to perform a succession of A/D conversions of a knock sensor signal at fixed periodic intervals during each of successive knock judgement intervals, with each knock judgement interval corresponding to a specific cylinder of the engine. The knock sensor signal A/D values thereby obtained during a knock judgement interval are processed during the final part of that interval, and the results used to judge whether or not knocking is currently occurring in the corresponding cylinder. During an interval between the end of performing the knock sensor signal A/D conversions in a knock judgement interval for one cylinder and the start of performing successive A/D conversions of a knock sensor signal in the immediately succeeding knock judgement interval (corresponding to the succeeding cylinder, where "succeeding" is with respect to the ignition sequence of the cylinders), a compensation value calculation means of the apparatus first controls the A/D converter to convert at least one DC reference voltage having a fixed (known) value to an A/D value (i.e., a value containing an error amount that varies in accordance with the operating temperature, etc., of the A/D converter). That A/D value (or values) of reference voltage is then used to calculate a compensation coefficient.

For example if two reference voltages Va, Vb are utilized, with the corresponding logical (i.e., ideal accurate) A/D values designated as Xa, Xb, then designating the actual corresponding A/D values as Ya, Yb, a compensation coefficient can be calculated as (Xa−Xb)/(Ya−Yb). Such an operation for deriving reference voltage A/D values and using these to calculate a (new) compensation coefficient value is referred to herein as a compensation coefficient updating operation.

The apparatus further includes compensation means, for applying the compensation coefficient to compensate each of the successive knock sensor signal A/D values that are obtained in the succeeding knock judgement interval, to thereby obtain successive compensated A/D values, and a digital filter for performing filter processing of the successively obtained compensated A/D values (i.e., as a series of digital values occurring with a fixed period).

Thus with such a knock sensor signal processing apparatus, before acquisition of a set of successive knock sensor signal A/D values for a specific cylinder is commenced, a "learning" operation is performed to obtain an updated value of a coefficient which is applied to correct the obtained A/D values, before these are processed to perform knock judgement. Hence, since the judgement is always performed based on values that are unaffected by variations in operating temperature and power supply voltage of the A/D converter, accurate knock judgement can be ensured.

The compensation value calculation means may be configured to perform each compensation coefficient updating operation, after completion of a knock judgement interval of one cylinder, immediately prior to commencement of deriving successive knock sensor signal A/D values in the next knock judgement interval (i.e., for the succeeding cylinder). In that case, it can be ensured that each updated value of compensation coefficient will provide maximum accuracy of compensation of the knock sensor signal A/D values, since there is a minimized possibility that the A/D converter characteristics will change between the point at which the updated compensation coefficient is obtained and the completion of deriving the succeeding knock sensor signal A/D values.

Alternatively, the compensation value calculation means may be configured to is to perform each compensation coefficient updating operation immediately following the end of a knock judgement interval. This is advantageous when the engine is operating in a condition (e.g., during sudden acceleration) whereby the acquisition of knock sensor signal A/D values for a cylinder must begin as soon as possible after the end of a knock judgement interval of the preceding cylinder.

Furthermore, the compensation value calculation means may be configured to perform a compensation coefficient updating operation once at each ignition time point of the engine. This enables the effects of variations in operating temperature and power supply voltage upon the accuracy of the compensated knock sensor signal A/D values to be minimized. In particular, this serves to maintain accuracy of these values under a condition in which the level of power supply voltage fluctuates due to variations of the (engine-driven) alternator voltage at the ignition time points.

Alternatively, the compensation value calculation means can be configured to perform a compensation coefficient updating operation once in every n ignition time points, where n is an integer of value 2 or greater. This is advantageous when it is mainly required to reduce the effects of variations in operating temperature upon the knock sensor signal A/D conversion accuracy. For example, the value of n may be set at an appropriate small value at the time of engine starting, with the value of n being increased to a larger value after a fixed time interval has elapsed after engine starting, when the operating temperature of the A/D converter will have stabilized.

As a further alternative, the compensation value calculation means can be configured to increase the value of n in accordance with increases in engine speed. This is advantageous in the case of high-speed engine rotation, which causes the interval between successive knock judgement intervals to become extremely short. Since in such a condition the value of n becomes large, i.e., the frequency of performing successive compensation coefficient updating operations is reduced.

In particular, if for example a compensation coefficient updating operation is performed at each ignition time point when the engine speed is 500 rpm, and is performed once in every 10 ignition time points when the engine speed is 5000 rpm, then the period of performing successive compensation coefficient updating operations will become substantially constant, irrespective of engine speed. Thus the effectiveness of the knock sensor signal A/D value compensation will be uniform, with respect to variations in operating temperature.

From another aspect, the compensation means preferably perform compensation of each of the successively derived A/D values during each knock judgement intervals, by utilizing a compensation coefficient value that is held unchanged throughout that knock judgement interval.

This is preferable since, if the compensation coefficient value is changed while compensation is being applied, i.e., while with the resultant compensated knock sensor signal A/D values are being subjected to digital filter processing, then continuity of the filter processing results cannot be maintained.

From another aspect, the voltage levels of the DC reference voltages are preferably predetermined such as to ensure increased accuracy of compensation of the knock sensor signal A/D values when the amplitude of the knock sensor signal is low, by comparison with the accuracy when the amplitude is relatively high.

This is due to the fact that to reliably perform knock judgement based on results of filtering digital values of a knock sensor signal, it is essential to ensure high accuracy of the digital values when the amplitude of the knock sensor signal is small.

To achieve this, the value of each DC reference voltage is preferably located between the highest value and lowest value in a permissible analog input voltage range of the A/D converter.

For example, if the power supply voltage of the A/D converter is 5 V, the permissible range of analog input signal values (and hence the range of variation of the knock sensor signal as supplied to the A/D converter) will in general be from 0 V to 5 V. In that case the central voltage of the knock sensor signal should be set at 2.5 V. Two reference voltages can then be utilized to calculate each compensation coefficient, with these reference voltages having respective values that are between 0 V and 2.5 v, and between 2.5 V and 5 V, e.g., are respectively 1.25 V and 3.75 V.

This can ensure high accuracy of A/D conversion even when the amplitude of the knock sensor signal (with respect to the center value) is small.

In addition, when a plurality of reference voltages are utilized, one of these is preferable made identical to the central voltage of the knock sensor signal (i.e., as inputted to the A/D converter). This will further serve to ensure high accuracy of compensation can be applied to the knock sensor signal A/D values when the amplitude of the knock sensor signal is small.

From another aspect, when the knock sensor signal processing apparatus comprises a first apparatus which performs the knock sensor signal A/D conversions under the control of A/D converter control means, and also performs and compensation coefficient calculation operations and compensation of the knock sensor signal A/D values, with resultant compensated A/D values being transmitted to a second apparatus in response to respective request command transmitted from the second apparatus as described above, the A/D converter control means of the first apparatus can be configured to inhibit the start of performing knock sensor signal A/D conversion operations during an interval that extends from the commencement of executing a compensation coefficient updating operation until completion of that operation, even if request commands are received from the second apparatus while the updating operation is in progress.

In that case, in a temporary condition in which commands for acquisition of knock sensor signal A/D values for a cylinder begin to be transmitted from the second apparatus immediately following completion of a knock judgement interval for the preceding cylinder (due for example to a sudden acceleration of the engine), it is ensured that an accurate updated compensation coefficient will be reliably calculated. Thus, accurate compensation of the subsequently derived knock sensor signal A/D values can be ensured, so that accuracy of knock judgement can be maintained under such a condition.

Alternatively, such a knock sensor signal processing apparatus can be configured whereby the compensation value calculation means of the first apparatus interrupts a compensation coefficient updating operation if a request command is received from the second apparatus while execution of the updating operation is in progress, with the A/D converter control means then initiating successive A/D conversion operations to derive successive knock sensor signal A/D values at fixed periodic intervals in response to successive request commands from the second apparatus. With such a configuration, the compensation means applies compensation to each of these knock sensor signal A/D values by utilizing a compensation coefficient that has been derived in an immediately preceding (completed) compensation coefficient updating operation.

In that case, in a temporary condition in which commands for acquisition of knock sensor signal A/D values for a cylinder begin to be transmitted from the second apparatus immediately following completion of a knock judgement interval for the preceding cylinder (due for example to a sudden acceleration of the engine), A/D conversions of a knock sensor signal can be rapidly started at the point of completion of the knock judgement interval for the preceding cylinder. Compensated knock sensor signal A/D values can thereby rapidly begin to be transmitted to the second apparatus, to be digitally filtered.

Since such a condition will only occur intermittently, for a short duration, no adverse effect will result from utilizing a compensation coefficient, in a knock judgement interval, that has been calculated immediately before a preceding knock judgement interval.

From another aspect, the knock sensor signal processing apparatus may include an amplifier for operating on an input analog signal (i.e., one or more reference voltages, and the knock sensor signal) and supplying the resultant output analog signal to the A/D converter, with the amplifier having a gain of M, where M is a positive integer, and amplifying the input analog signal with respect to a predetermined fixed voltage that is different from a zero voltage level with respect to the reference voltages. That is to say, the output analog voltage has an offset value that is equal to the aforementioned fixed voltage. In that case, the compensation value calculation means is preferably adapted to obtain an A/D value of a reference voltage by inputting to the amplifier a voltage that is determined in accordance with a combination of the reference voltage, the gain value M and the predetermined fixed voltage, for producing a logical A/D value of the reference voltage from the A/D converter.

Preferably, the predetermined fixed voltage is made the central voltage of the knock sensor signal.

This has the advantage that when the compensation coefficient is calculated by using A/D values of reference voltages, the compensation that is thereafter applied to successive knock sensor signal A/D values by utilizing that compensation coefficient will not only compensate for inaccuracy of the A/D conversion operation itself, but will also compensate for inaccuracy in the gain of the amplifier with respect to a predetermined gain value.

From another aspect, when the knock sensor signal processing apparatus comprises a first apparatus which performs the knock sensor signal A/D conversions under the control of A/D converter control means, and also performs and compensation coefficient calculation operations and compensation of the knock sensor signal A/D values, with resultant compensated A/D values being transmitted to a second apparatus in response to respective request command transmitted from the second apparatus and with the second apparatus performing digital filtering of the compensated knock sensor signal A/D values as described above, the first apparatus may include an amplifier for operating on an input analog signal and supplying a resultant output analog signal to the A/D converter, and a multiplexer that receives a plurality of analog signals via respective input channels. The multiplexer is controlled to select a designated one of the channels, and thereby supply the corresponding one of the plurality of analog signals as an input signal to the amplifier.

In that case, the second apparatus is preferably configured to transmit to the first apparatus only two types of command, i.e., as a first type, the aforementioned request command for receiving a knock sensor signal A/D value, and as a second type, a command which designates the value of gain that is to be set for the amplifier and the input channel that is to be selected by the multiplexer. The first apparatus is configured to respond to receiving the second type of command by initiating a compensation coefficient updating operation.

This has the advantage of simplifying communication between the first apparatus and second apparatus, since it becomes unnecessary for the second apparatus to transmit a special (i.e., third) type of command for designating that a compensation coefficient updating operation is to be started by the first apparatus. From another aspect, the compensation value calculation means may be configured to perform each compensation coefficient updating operations by successively deriving a plurality of A/D values of each reference voltage from the A/D converter, thereby calculating an average A/D value for each reference voltage, and using the average values in calculating an updated compensation coefficient value.

This has the advantage that accurate values can be obtained for each average reference voltage A/D value even if the A/D conversions are being affected by electrical noise, and hence more accurate compensation coefficient values can be calculated.

A similar effect can be obtained if a plurality of compensation coefficient values are successively calculated in each compensation coefficient updating operation, with the average of that plurality of values being then calculated, and the resultant average value of updated compensation coefficient then utilized to compensate each of the knock sensor signal A/D values in the succeeding knock judgement interval.

From another aspect, a knock sensor signal processing apparatus may further include a resistive voltage divider for producing a stepped-down voltage from a fixed DC voltage such as a power supply voltage, with that stepped-down voltage being set as the central voltage of the knock sensor signal (as inputted to the A/D converter). The stepped-down voltage is also converted to an A/D value by the A/D converter, and that A/D value is subtracted from each of the knock sensor signal A/D values produced from the A/D converter. In that way, each value resulting from such a subtraction expresses an actual amplitude value of the knock sensor signal. Compensation by a compensation coefficient is applied to each of values resulting from the subtraction operation, to obtain the compensated A/D values that are then subjected to digital filtering.

For the purpose of setting the center voltage of the knock sensor signal, the stepped-down voltage may be applied via a buffer circuit, i.e., with the central voltage of the knock sensor signal being set as the output voltage from the buffer circuit. In that case, the output voltage from the buffer circuit is converted to an A/D value, which is subtracted from each of the knock sensor signal A/D values. This will ensure that the (digital) amplitude values thereby derived for the knock sensor signal will be unaffected by variations in the characteristics of the buffer amplifier, in particular, variations in offset voltage.

BRIEF DESCRIPTION OF THE DRAWINGS

FIGS. 2A, 2B illustrate data formats of commands utilized P1, N1, with the first embodiment;

FIG. 3 is a timing diagram for use in describing communication between an input IC and a processing IC with the first embodiment;

FIG. 4 is a timing diagram for use in describing the operation of the input IC and communication between the input IC and processing IC, with the first embodiment;

FIGS. 17A, 17B are diagrams for use in describing a third alternative embodiment;

FIG. 18 is a diagram for use in describing a fourth alternative embodiment;

DESCRIPTION OF PREFERRED EMBODIMENTS

An embodiment of a knock sensor signal processing apparatus (referred to in the following simply as a signal processing apparatus) will be described in the following, which is applicable to a V-6 type of vehicle engine. i.e., having two banks of three cylinders.

Figure 1:
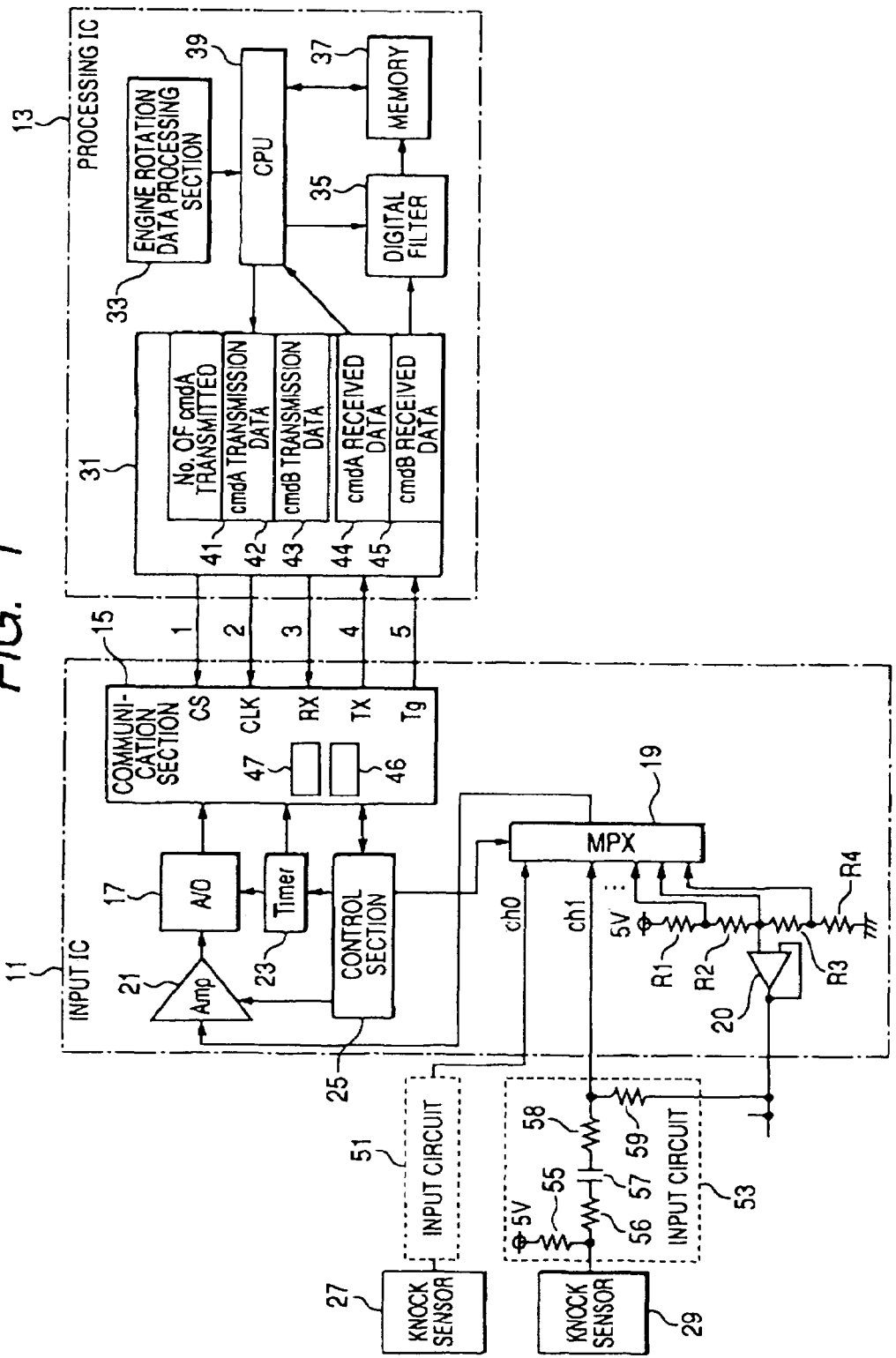
FIG. 1 is a general system block diagram of a first embodiment of a knock sensor signal processing apparatus.

FIG. 1 is a system block diagram of the embodiment, which as shown is based on a input IC 11 and a processing IC 13. These communicate with one another via a set of signal leads 1 to 5, as described hereinafter.

The input IC 11 includes a communication section 15 for performing communication with the processing IC 13, an A/D converter 17, a multiplexer 19 which selects one of a plurality of input channels respectively designated as ch0, ch1, etc., and which outputs the signal that is being supplied via the selected input channel. That selected signal is supplied to a amplifier 21, to be amplified by a specific amount of gain, then is supplied to the A/D converter 17. The input IC 11 further includes a timer circuit 23, which generates and outputs a timing signal at successive fixed intervals whose duration is designated as Tc (assumed to be 10 microseconds with this embodiment). The value of Tc determines the durations of the intervals in which communication is performed between the ICs 11 and 13 and the intervals in which the A/D converter 17 is activated. The input IC 11 further includes a control section 25, for controlling each of the above sections.

With this embodiment, the A/D converter 17 is a pulse phase difference encoder circuit, whose operation is based on applying an input analog voltage as a common supply voltage of a plurality of series-connected delay stages (delay circuits), with each A/D value obtained as count of a number of delay stages traversed by a pulse signal in a fixed interval. Respective knock sensors 27 and 29 are provided for the two cylinder banks of the engine, with the sensor signal from the knock sensor 27 being used to detect knocking in any of the No. 1, No. 3, or No. 5 cylinders (i.e., the right bank of cylinders), and the sensor signal from the knock sensor 27 being used to detect knocking in any of the No. 2, No. 4, or No. 6 cylinders of the engine (i.e. the left bank of cylinders). The sensor signals from the knock sensors 27, 29 are respectively transferred via input circuits 51 and 53 to the ch0 and ch1 input channels of the multiplexer 19.

The knock sensors of this embodiment are vibration type sensors, which produce an analog signal varying in accordance with the level of vibration that is sensed.

In the input IC 11, a set of series-connected resistors R1, R2, R3, R4, each of identical resistance value, form a resistive voltage divider which performs voltage division of the 5 V supply voltage of the input IC 11 (i.e., the common power supply voltage of each of the sections, including the A/D converter 17), to derive a set of reference voltages. The resistive voltage divider produces 3.75 V (i.e., 5×¾) V at the junction of the resistors R1, R2, with this being referred to herein as the reference voltage A, 2.5 V (i.e., 5×½) V at the junction of the resistors R2, R3, referred to herein as the reference voltage B, and 1.25 V (i.e., 5×¼) V at the junction of the resistors R3, R4, referred to herein as the reference voltage C.

These reference voltages are inputted to respective input channels of the multiplexer 19.

Each of the input circuits 51, 53 are of identical configuration, so that only the input circuit 53 will be described. This includes a pull-up resistor 55 that is connected at one terminal to the 5 V power supply voltage and the other terminal connected to the signal line from the knock sensor 29, a resistor 56 having one terminal connected to the junction of the resistor 55 and the signal lead from the knock sensor 29 and having the other terminal connected to one terminal of a capacitor 57. The other terminal of the capacitor 57, which serves as a differentiator capacitor, is connected to one terminal of a resistor 58, while the other terminal of the resistor 58 is connected to one terminal of a resistor 59. The junction of the resistors 58, 59 is connected to the input channel ch1 of the multiplexer 19.

Within the input IC 11, the reference voltage B is inputted to a buffer circuit 20, which has a gain of 1, with the output from the buffer circuit 20 (i.e., which is nominally identical to the reference voltage B) being connected, external to the input IC 11, to the other end of the aforementioned resistor 59 in the input circuit 53, and also to a corresponding resistor in the input circuit 51.

The knock sensor signals from the knock sensors 27, 29, which are respectively inputted to the input circuits 51, 53, each vary within the range 0 V to 5 V.

In the input IC 11, although not specifically indicated in FIG. 1, the output voltage from the buffer circuit 20 (nominally 2.5 V, as described above) is supplied to the amplifier 21 as an amplification reference voltage, i.e., the amplifier 21 amplifies the output voltage from the multiplexer 19 by using the output voltage from the buffer circuit 20 as a reference value. Specifically, when the input voltage of the amplifier 21 is identical to the output voltage from the buffer circuit 20, an identical value of output voltage (2.5 V) is produced from the amplifier 21. When the input voltage of the amplifier 21 differs from the output voltage of the buffer circuit 20, the output voltage from the amplifier 21 is equal to the sum of the difference amount multiplied by the amplifier gain, and the value of output voltage of the buffer circuit 20. Thus, the output voltage of the amplifier 21 varies in positive and negative directions with respect to (a nominal) 2.5 V as a center value.

The processing IC 13 includes a communication section 31 for communication with the input IC 11, a engine rotation data processing section 33 for detecting the engine crankshaft rotation angle based on a pulse signal produced from a rotation sensor (not shown in the drawings) in synchronous with the crankshaft rotation, as is well known. The processing IC 13 further includes a digital filter 35 for performing digital filter processing, a memory 37 for successively storing processing results that are obtained by the digital filter 35, and a CPU 39 for performing processing to execute activation and halting, etc., of the operations of the communication section 31 and the digital filter 35.

The communication section 31 includes registers 41, 42, 43 constituting a No. 1 storage section, and registers 44, 45 constituting a No. 2 storage section, for holding commands and data that are communicated between the processing IC 13 and the input IC 11. The commands being of two types, respectively designated as A-type commands and B-type command (indicated respectively as cmdA, cmdB in the drawings), respectively. The register 41 is a register into which is written the number of A-type commands that have been transmitted by the communication section 31. Data that are to be transmitted in A-type commands (as described hereinafter) are written into the register 42, while data that are to be transmitted in B-type commands are written into the register 43.

Data received from the input IC 11 in response to A-type commands transmitted from the processing IC 13 are stored in the register 44. These data are transmitted within a 16-bit data set, referred to in the following as a "cmdA response data set". Similarly, data received from the input IC 11 in response to the contents of B-type commands transmitted from the processing IC 13 are stored in the register 44. These data are transmitted within a 16-bit data set, referred to in the following as a "cmdB response data set".

The communication section 15 of the input IC 11 serves as a communication interface between the input IC 11 and processing IC 13, and includes a transmission data register 46 for holding data that are to be transmitted from the input IC 11 to the processing IC 13, and a received data register 47 for holding data that have been received from the processing IC 13.

Of the signal lines 1 to 5 which link the input IC 11 and processing IC 13, the signal line 1 transfers a chip select signal CS from the processing IC 13 to the input IC 11. When the chip select signal CS goes to the active level (in this embodiment, a low level), communication with the communication section 15 becomes enabled.

The signal line 2 serves to supply a communication clock signal CLK from the processing IC 13 to the communication section 15 of the input IC 11. When serial data are transferred between the communication section 15 and communication section 31 (i.e., one bit at a time), the data bits are synchronized with the communication clock signal CLK.

The signal line 3 is a communication line for transmitting data from the communication section 31 to the communication section 15. The signal line 4 is a communication line for transmitting data from the communication section 15 to the communication section 31.

The signal line 5 serves to supply a trigger signal TG from the communication section 15 to the communication section 31. The trigger signal TG is a signal which goes to the high level once each time that a timer signal is outputted from the timer circuit 23, i.e., once in every 1 μS.

The format of communication data that are exchanged between the ICs 11 and 13 will be described referring to FIG. 2. With this embodiment, the communication data are 16-bit data. The formats of the aforementioned two types of command (A-type command, B-type command) that can be transmitted from the processing IC 13 to the input IC 11 are illustrated in FIG. 2A. An A-type command is a function setting command. Specifically, such a command conveys data including at least information for designating the input channel that is to be selected by the multiplexer 19, and information for designating the value of gain that is to be set for the amplifier 21.

In each A-type command, the leading two bits are fixed as a command code [10], indicating that this is an A-type command. A succeeding plurality of bits (with this embodiment, 3 bits) conveys the aforementioned information designating the input channel that is to be selected by the multiplexer 19, a succeeding plurality of bits (with this embodiment, 3 bits) conveys the aforementioned information designating the gain that is to be set for the amplifier 21.

Each A-type command also includes a plurality of bits conveying information for other purposes (not relevant to this description), which are indicated as "other (1)" in FIG. 2A. A final set of bits (with this embodiment, 5 bits) are not utilized, and so are each fixed as 0.

A B-type command is a form of request command, i.e., for requesting the input IC 11 to control the A/D converter 17 to perform a series of A/D conversion operations on a knock sensor signal, and to control the communication section 15 to transmit resultant A/D values to the processing IC 13. In each B-type command, the leading two bits are fixed as a command code [01], indicating that this is a B-type command. The remaining 14 bits are unused, and are each fixed as 0.

The formats of the aforementioned two types of response data sets that can be transmitted from the input IC 11 to the processing IC 13 are illustrated in FIG. 2B. As shown, in a cmdA response data set, the leading two bits are fixed as a command code [10], indicating that this is an A-type command. A succeeding plurality of bits (with this embodiment, 3 bits) conveys the aforementioned information indicating the input channel that has actually been selected by the multiplexer 19, then a succeeding plurality of bits (with this embodiment, 3 bits) conveys information indicating the value of gain that has actually been set for the amplifier 21.

Each cmdA response data set also includes a plurality of bits conveying information for other purposes, which are indicated as "other (2)" in FIG. 2B. A final set of bits (with this embodiment, 5 bits) are each fixed as 0.

Also as shown in FIG. 2B, each cmdB response data set has the leading two bits fixed as a command code [01], indicating that this is a cmdB response data set, while the remaining 14 bits express a plurality of successively derived A/D values.

The basic features of communication between the ICs 11 and 13 will be described referring to FIGS. 3 and 4. In the following description, angular values of engine crankshaft rotation from a reference TDC (top dead center) position corresponding to any specific cylinder are designated with respect to TDC (i.e., as ATDC or "after top dead center" positions), for example with a 90° rotation angle from TDC being designated as ATDC90° CA.

It should be noted that the term "TDC position" for a cylinder is used herein to refer to a TDC position at which ignition occurs in that cylinder.

The uppermost stage in FIG. 3 (designated NE30° CA) shows time points at which the crankshaft rotates to successive angles that differ by 30°, starting from the TDC positions for respective cylinders The numberings of the cylinders correspond to the firing sequence, i.e., with ignition occurring in the sequence No. 1 cylinder, No. 2 cylinder, . . . No. 6 cylinder. The time points at which the crankshaft angle corresponds to the TDC positions for the respective cylinders are indicated accordingly, e.g., with #1 TDC corresponding to TDC for the No. 1 cylinder, etc. Each interval for which the chip select signal CS is set at the low (active) level will be designated as a data communication period.

FIG. 4 shows details of the contents of the communication operations performed within the interval indicated by the broken-line outline K1 in FIG. 3. In the following description, each interval within which a burst of clock signal CLK pulses is generated, extending from the time point at which the chip select signal CS goes from the high to the low level until the first timing signal is produced, or extending between two successive timing signals, will be referred to as a communication interval. However during such an interval, actual communication between the ICs 11 and 13 is performed only while the communication clock signal CLK is being generated by the input IC 11. Furthermore during the first communication interval, due to the trigger signal TG being at the low level, transmission from the input IC 11 to the processing IC 13 is not enabled.

Each interval in which the crankshaft rotates from the TDC position for a cylinder to a position immediately following the ATDC 90° CA position serves as a knock judgement interval for that specific cylinder. During a knock judgement interval, successive A/D conversion values of a knock sensor signal corresponding to that cylinder are transmitted from the input IC 11 to the processing IC 13, the received A/D values are digitally filtered, and the filter results utilized in knock judgement processing. The knock judgement interval are indicated as respective high-level intervals in the third stage ("knock judgement intervals") of FIG. 3.

More specifically, during an interval extending from TDC to the ATDC 90° CA for a cylinder, a set of knock sensor signal A/D values are successively transmitted to the processing IC 13, and the processing IC 13 completes the digital filter processing and judgement of the filter processing results immediately after the ATDC 90° CA point has been reached for the next cylinder.

In the following, respective sets of operations that are performed sequentially will be designated as operations (1), operations (2), etc Operations (1)

At each timing when the ATDC 90° CA point is reached for a cylinder (i.e., corresponding to the end point of a knock judgement interval for that cylinder) the chip select signal CS sent from the processing IC 13 to the input IC 11 is changed from the low to the high (inactive) level, and communication between the input IC 11 and the processing IC 13 is temporarily halted. Thereafter, when preparation for the next data communication period has been completed by the processing IC 13 (at a time point which precedes, by a sufficient amount, the time point at which a knock judgement interval is to commence for the succeeding cylinder) the chip select signal CS sent from the processing IC 13 to the input IC 11 is changed from the high to the low (active) level, so that communication between the input IC 11 and the processing IC 13 is enabled.

In that way, the chip select signal CS changes from the low to the high level each time that the ATDC 90° CA time point is reached for any of the cylinders, and subsequently changes from the high to the low level at a time point that occurs sufficiently prior to the next TDC timing of the succeeding cylinder (i.e., where "succeeding cylinder" signifies the cylinder which is next with respect to the aforementioned ignition sequence of the cylinders).

Operations (2)

When the chip select signal CS changes from the high to the low level, then as shown in FIG. 4, the communication section 31 of the processing IC 13 outputs the communication clock signal CLK via the signal line 2 to the input IC 11. In addition, the communication section 31 transmits a cmdA response data set (which is being held in the register 42) to the input IC 11 via the signal line 3, one bit at a time in synchronism with the communication clock signal CLK. In parallel with this, the communication section 31 receives data that are transmitted from the input IC 11 via the signal line 4 one bit at a time in synchronism with the communication clock signal CLK, and stores these data in the register 44. With this embodiment, the first to third bits (from the leading bit) of an A-type command that is transmitted from the processing IC 13 to the input IC 11 (i.e., bits which indicate the channel that is to be selected by the multiplexer 19) are set to select the input channel ch0 or ch1 corresponding to the knock sensor 27 or 29 of the appropriate one of the two cylinder banks.

Operations (3)

The communication section 15 of the input IC 11 receives the data of each A-type command sent via the signal line 3, synchronized with the communication clock signal CLK, and stores the data in the received data register 47. In parallel with receiving each A-type command, the communication section 15 transmits to the processing IC 13 a set of data that are currently held in the transmission data register 46, sent via the signal line 4 one bit at a time, synchronized with the communication clock signal CLK. Such a parallel transfer of data between the ICs 11 and 13, by the operations (2), (3) above, is completed during an interval that is no longer than 10 microseconds. With this embodiment, five successive A-type commands are transmitted from the processing IC 13 to the input IC 11 after the chip select signal CS goes to the active level.

Operations (4)

In addition, when the chip select signal CS goes to the low (active) level, the timer circuit 23 in the input IC 11 becomes activated, and thereafter outputs a timing signal once every 10 microseconds. These occurrences of the timing signals are indicated by the upward-directed arrows in the "Timer" stage of FIG. 4.

Operations (5)

Each time a timing signal is outputted from the timer circuit 23, the trigger signal TG sent from the input IC 11 to the processing IC 13 goes from the low to the high level, and remains at the high level during a specific interval (less than 10 microseconds). During each of these high-level intervals of signal TG, the A/D converter 17 is controlled to perform a single A/D conversion of the signal (analog voltage) from the input channel which is currently selected by the multiplexer 19, with that signal being transferred to the A/D converter 17 via the amplifier 21.

The gain value of the amplifier 21 and the input channel that is selected by the multiplexer 19, after the chip select signal CS goes to the active level, are basically determined by the contents of an A-type command thereafter received from the processing IC 13. However, during an interval that commences when the chip select signal CS goes to the low level and continues until four successive timing signals have been produced from the timer circuit 23 (i.e., the first four successive A-type commands have been received), the gain of the amplifier 21 is fixed at the value 1, while channel selection by the multiplexer 19 is performed in a fixedly predetermined pattern. Specifically, as shown in the lowermost stage ("A/D conversion processing") when the first timing signal is produced, the control section 25 controls the multiplexer 19 to select the input channel through which the aforementioned reference voltage B is supplied, so that A/D conversion of the reference voltage B is then performed by the A/D converter 17. When the second timing signal is outputted, the multiplexer 19 is controlled to select the input channel through which the reference voltage A is supplied, so that A/D conversion of the reference voltage A is performed by the A/D converter 17. When the third timing signal is outputted, the multiplexer 19 is controlled to select the input channel through which the reference voltage C is supplied, so that A/D conversion of the reference voltage C is performed by the A/D converter 17.

Operations (6)

When a timing signal is outputted from the timer circuit 23 and the trigger signal TG sent from the communication section 15 the communication section 31 goes to the high level as described above, the processing IC 13 responds by perform the operations (2) described above, whereby an A-type command whose data are is held in the register 42 of the communication section 31 is transmitted to the input IC 11, and whereby in parallel with this a cmdA response data set is received by the processing IC 13 from the input IC 11, and stored in the register 44.

Operations (7)

In addition, in the same sequence as described for operations 3 described, the communication section 15 of the input IC 11 receives the A-type command from the processing IC 13 and stores its data contents in the received data register 47, and concurrent with this, transmits a cmdA response data set conveying the data currently held in the transmission data register 46, to the communication section 31 of the processing IC 13.

Operations (8)

Thereafter, as a result of the operations (6) and (7) being performed in parallel by the input IC 11 and processing IC 13, a communication operation between the input IC 11 and the processing IC 13 becomes completed. Upon completion, the trigger signal TG is reset to the low level by the communication section 15.

With this embodiment, the communication clock signal CLK has a frequency of 2 MHz, and the communication data have a word length of 16 bits, so that the time required to complete one communication operation (i.e., send/receive one data word) is 8 microseconds (i.e., 0.5 microseconds× 16). In addition, the time that elapses from the point at which the trigger signal TG goes to the high level until the time point at which communication then begins is less than 1 microsecond. The time required for the A/D converter 17 to complete an A/D conversion is less than 8 microseconds. Hence, a single communication operation (i.e., parallel sending and receiving of a command and response data, between the ICs 11 and 13) and a concurrently performed A/D conversion operation, can be completed entirely within a single communication interval whose duration is no more than 10 microseconds, as illustrated in FIG. 4.

Operations (9)

Thereafter, until a predetermined number of A-type commands have been successively transmitted from the processing IC 13 to the input IC 11 (with this embodiment, 5 commands), the operations 6 to 8 above are repetitively performed.

Hence with this embodiment, after the chip select signal CS goes to the low level, four successive communication operations are first performed in each of which an A-type command is transmitted to the input IC 11. In the first of these communication operations, only dummy data are transmitted by the input IC 11, and since at that time the trigger signal TG is at the low level, these data are not utilized by the processing IC 13. During the second, third and fourth communication intervals (i.e., following the first, second and third timing signals respectively) A/D conversions of the reference voltages B, A and C are successively performed, for use by the control section 25 in compensation processing as described hereinafter. In each of these three communication intervals, the reference voltage A/D value obtained (within that interval) is transmitted to the processing IC 13.

Prior to the during the fifth communication interval, the control section 25 of the input IC 11 controls the multiplexer 19 to select the one of the input channels (ch0 or ch1) that corresponds to the sensor signal from the appropriate knock sensor (27 or 29), as designated in the A-type commands received from the processing IC 13, and also sets the gain of the amplifier 21 to a value as specified in the A-type commands. In the fifth communication interval, in response to receiving the fifth A-type command, the input IC 11 transmits to the processing IC 13 a cmdA response data set which specifies the input channel that has actually been selected by the multiplexer 19 and the gain value that has been set for the amplifier 21.

Immediately after the fourth communication interval, the input IC 11 uses the A/D values of the reference voltages A, B and C in calculating a compensation coefficient. This is applied to correct each of respective knock sensor signal A/D values that are obtained in the succeeding knock judgement interval (i.e., which begins after the fifth communication interval). The resultant compensated knock sensor signal A/D values are transmitted to the processing IC 13 in respective communication intervals, with each compensated knock sensor signal A/D value being transmitted in the communication interval immediately following that in which it is obtained (as indicated by the upwardly sloping broken-line arrows in FIG. 4, from the "A/D conversion processing" stage.

The method of calculating the compensation coefficient is described hereinafter.

The operations (2) to (9) above are illustrated as the contents of the broken-line outline K2 in FIG. 4.

Operations (10)

After the fifth A-type command transmitted from the communication section 15 has been received by the input IC 11, then when the trigger signal TG next goes to the high level (in the sixth communication interval), communication is performed between the communication section 31 of the input IC 11 and the communication section 15 in the same way as described for operations 6 and 7 above. However in this case, the communication section 31 transmits a B-type command held in the register 43 to the input IC 11, and, in parallel with this, stores data of a cmdA response data set that is transmitted from the input IC 11, in the register 44.

This cmdA response data set, corresponding to the fifth of the successive "results" shown in the fourth stage ("Input IC→Processing IC") in FIG. 4, conveys data that report to the processing IC 13 the results of settings that have been performed (input channel selected for the multiplexer 19, gain value set for the communication section 31, etc.) in response to the preceding A-type command transmitted from the processing IC 13.

The above operations (10) correspond to the section of FIG. 4 enclosed within the broken-line outline K3.

Operations (11)

When the next of the 10 microsecond interval time points is reached, so that the trigger signal TG has gone to the high level, the communication section 31 of the processing IC 13 and the communication section 15 of the input IC 11 perform the same communications as described above for the operations 6 and 7. However in this case, the communication section 31 transmits a B-type command (held in the register 43) to the input IC 11, while concurrent with this, the communication section 31 receives a cmdB response data set from the communication section 15 (conveying a compensated knock sensor signal A/D value) and stores the received data in the register 45, instead of the register 44.

Also during this communication interval, the communication section 15 of the input IC 11 stores the B-type command transmitted from the processing IC 13, in the received data register 47, and transmits the contents of the transmission data register 46. However at this time, the transmission data register 46 contains a cmdB response data set, which contains the knock sensor signal A/D value obtained during the preceding communication interval, compensated by using the aforementioned compensation coefficient.

More specifically, with this embodiment, when a sensor signal is converted to a digital value by the A/D converter 17, the A/D value of the reference voltage B (i.e., the 2.5 V central voltage of the 5 V power supply) is subtracted from that sensor signal A/D value, to thereby obtain the actual amplitude of the sensor signal as a digital value. That value is then subjected to compensation using the compensation coefficient, and the resultant compensated value is inserted in a cmdB response data set, which is stored in the transmission data register 46 until the succeeding communication interval, to be then transmitted to the processing IC 13.

In that next communication interval, a B-type command is again transmitted from the processing IC 13 to the input IC 11, while in parallel with this a cmdB response data set is read out from the transmission data register 46 and transmitted to the processing IC 13.

Operations (12)

Thereafter, in each of successive communication intervals, the operations 11 are repetitively performed to transfer successive compensated A/D values to the processing IC 13 at fixed periodic intervals, until the chip select signal CS returns to the high level.

The operations (11), (12) correspond to the portion within the broken-line outline K4 in FIG. 4.

Each of the A/D values that are thereby successively stored in the register 45 of the communication section 31 are transferred unchanged directly to the digital filter 35, to be subjected to digital filter processing. Once in every 10 microseconds, derived filter processing results are stored in the memory 37. These filter processing results may be stored unchanged in the memory 37. However it would be equally possible to perform data compression of these before storing in the memory 37, for example by integrating the successive result values obtained during a specific amount of crankshaft angular rotation and storing only the result of each integration operation, or integrating each of a fixed plurality of successively obtained result values, and storing the result of each integration operation.

Referring to the lowermost stage in FIG. 4 ("A/D conversion processing") the fourth of the successive A/D values (in the fifth communication interval, indicated within parentheses) is not utilized and is not transmitted to the processing IC 13.

The processing executed for communication between the ICs 11 and 13, processing executed by the CPU 39 of the processing IC 13, and processing executed by the communication section 31 of the processing IC 13 and by the input IC 11, will be described in the following referring to the flow diagrams of FIGS. 5 to 9.

Figure 5:
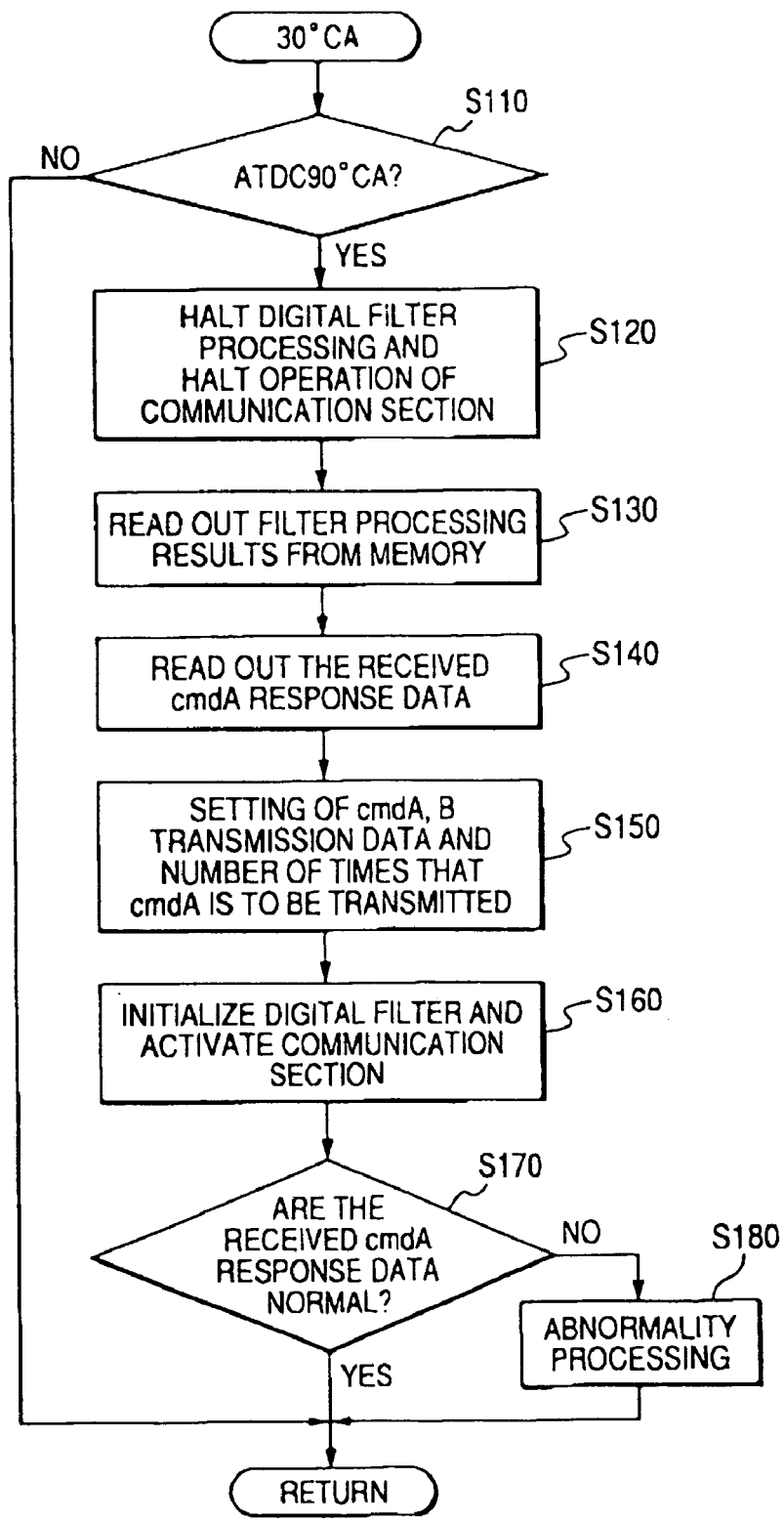
FIG. 5 is a flow diagram of processing performed by a CPU each time a 30° CA interrupt is generated, with the first embodiment.

Firstly, FIG. 5 shows 30° interrupt processing that is executed by the CPU 39 of the processing IC 13 at each of successive 30° crankshaft angle timings (i.e., each time point at which the crankshaft completes 30° of rotation). This processing is initiated in response to a command produced from the engine rotation data processing section 33.

As shown in FIG. 5, when this 30° interrupt processing is started, then firstly (step S110) the current crankshaft angle position is acquired, and a decision is made as to whether or not a 30° crankshaft angle timing has been reached which is a ATDC 90° CA timing for one of the cylinders.

If there is a NO decision in sampling time point S110, then this processing is ended. If there is a YES decision, i.e., a ATDC 90° CA timing has been reached for one of the cylinders, then operation advances to step S120 in which a halt command is issued to the digital filter 35 and to the communication section 31. The communication section 31 then (in step S220 described hereinafter) sets the chip select signal CS at the high level, so that communication with the communication section 15 of the input IC 11 is halted.

Next, in step S130, the filter processing results produced by digital filter 35 are read out from the memory 37. Of the processing results thus read out, the filter processing results obtained during the interval from the preceding ATDC 90° CA timing until the currently attained ATDC 90° CA timing are used by the CPU 39 (or by some other CPU) for knock judgement operations, i.e., to judge whether or not engine knocking is currently occurring. The knock judgement results are utilized in feedback control of the engine ignition timing.

Next (step S140) the data held in the register 44 of the communication section 31 are read out. These constitute the cmdA response data set that was most recently received from the input IC 11 i.e., which were received while the processing IC 13 was transmitting the first type-B command before the preceding knock judgement interval, i.e., in the processing corresponding to the outline K3 in FIG. 4.

In the following step (step S150) preparatory processing is performed for the next data communication period. Data (cmdA transmission data) constituting the A-type command that is to be transmitted to the input IC 11 in the next communication interval are written into the register 42 of the communication section 31, and similarly, data (cmdB transmission data) constituting the B-type command that is to be repetitively transmitted to the input IC 11 in the next data communication period are written into the register 43 of the communication section 31. In addition, the number of times for which the A-type command is to be successively transmitted to the input IC 11 (with this embodiment, 5 times) is written into the register 41 of the communication section 31.

The respective bits of the cmdA transmission data are as described hereinabove referring to FIG. 2B. The third to fifth bits from the leading bit, which designate the input channel that is to be selected by the multiplexer 19, are set to designate the input channel corresponding to the appropriate one of the two knock sensor signals. Specifically, the cylinder for which communication processing will be performed in the succeeding communication interval belongs to one of the two cylinder banks of the engine, which respectively correspond to the two knock sensors 27, 29. Hence, "the appropriate one of the two knock sensor signals" here signifies the sensor signal from the sensor that corresponds to the cylinder bank of the cylinder for which communication processing will be performed in the next data communication period, i.e., the cylinder for which the TDC position will next be reached.

For example if the current ATDC 90° CA timing is that for the No. 6 cylinder, then the next TDC timing will be reached for the No. 1 cylinder, which follows the No. 6 cylinder in the ignition sequence. In that case, the knock sensor signal corresponding to the right-side cylinder bank (from knock sensor 27) would be selected, so that the contents of the third to fifth bits in the A-type command will specify that the multiplexer 19 is to select the ch0 input channel.

Next (step S160) initialization of the digital filter 35 is performed, while in addition an activation command is sent to the digital filter 35 and to the communication section 31, to activate these. When this occurs, then in step S230 of FIG. 6 (as described hereinafter) the communication section 31 sets the chip select signal CS from the high to the low level, so that communication between the ICs 11 and 13 is enabled.

Next (step S170) a decision is made as to whether or not the contents of the received cmdA response data set, which were read out from the register 44 in step S140, are normal. Specifically, the values that have been set for the sensor signal input channel (ch0 or ch1), and the value of gain that has been set for the amplifier 21 by the input IC 11, are compared with the corresponding values which were specified in the previously transmitted A-type command sent from the processing IC 13 to the input IC 11 (transmitted in the preceding data communication period). If the received set values correspond to the specified values, then they received setting information data are judged to be normal, while otherwise they are judged to be abnormal.

If the values that were set by the input IC 11 are judged to be normal in step S170, then processing of this routine is ended, while if the set values are found to be abnormal then processing proceeds to step S180. In step S180, fail-safe abnormality processing is performed such as resetting the input IC 11, and/or discarding the filter processing results read out from the memory 37, without using these in knock judgement. Processing of this routine is then ended.

Figure 6:
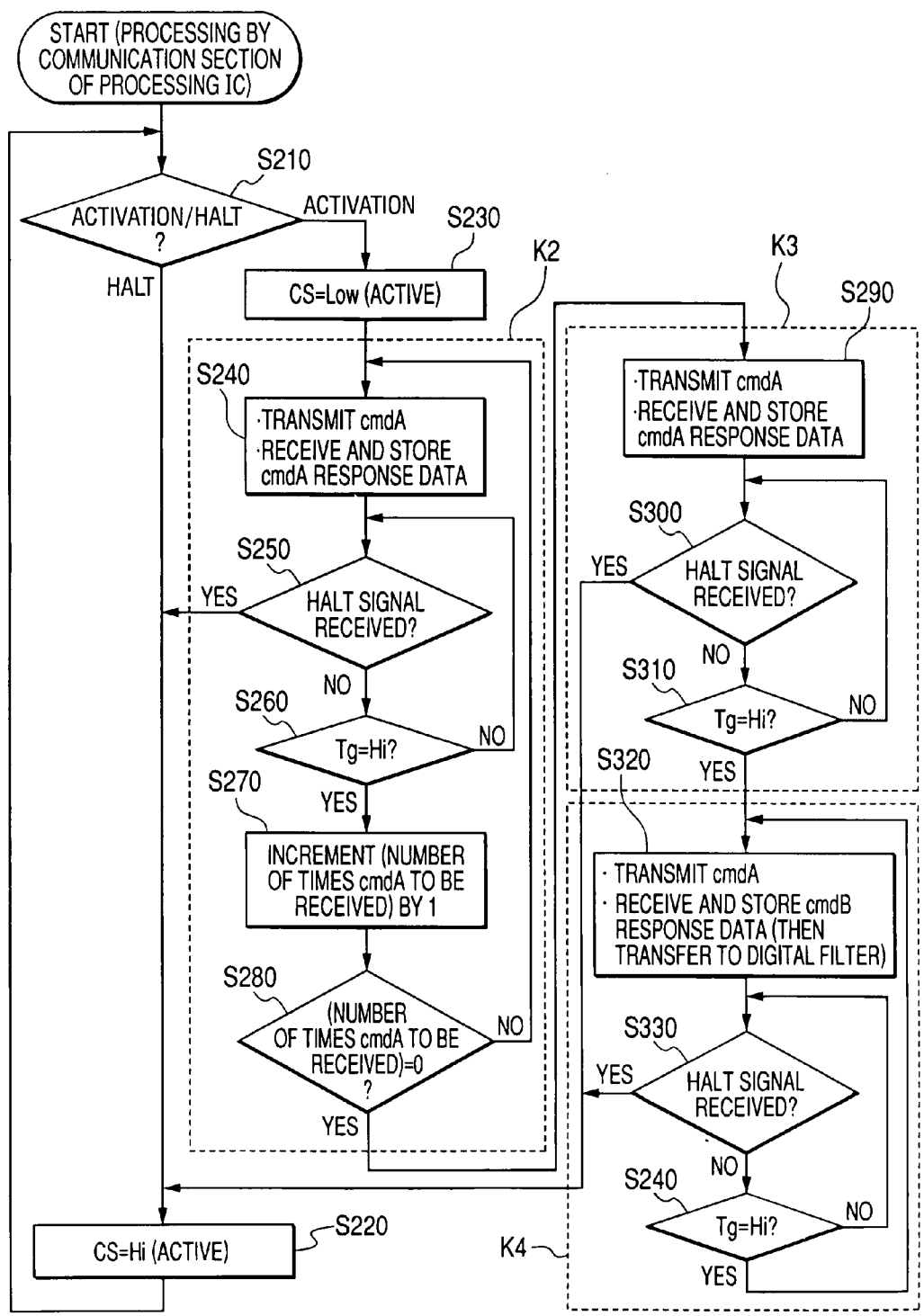
FIG. 6 is a flow diagram of processing performed by a communication section of the input IC, with the first embodiment.

Subsequently, the processing shown in FIG. 6 is executed by the communication section 31 of the processing IC 13. Firstly, operation waits until a halt command is issued by the CPU 39 in step S120, or an activation command is issued in step S160, in the processing shown in FIG. 5 above. When a command is received, a decision is made in step S210 as to whether this is a halt command or an activation command, and if it is a halt command, processing proceeds to step S220 in which the chip select signal CS that is sent to the input IC 11 is set at the high (inactive) level. Operation then returns to step S210.

When an activation command is received from the CPU 39, processing proceeds to step S230, in which the chip select signal CS is set at the low (active) level, and processing proceeds to step S240. In step S240, the operations (2) described above are performed, whereby the communication clock signal CLK is supplied to the input IC 11 via the signal line 2, while in addition the cmdA data set that is held in the register 42 is transmitted one bit at a time via the signal line 3 to the input IC 11, in synchronism with the communication clock signal CLK. The cmdA data which are transmitted at this time have previously been written into the register 42 by the CPU 39 in step S150 of FIG. 5. Concurrent with this, a cmdA response data set that is transmitted from the input IC 11 via the signal line 4 is received one bit at a time in synchronism with the communication clock signal CLK, and stored in the register 44.

It should be noted that in the first communication interval after the chip select signal CS has gone to the low (active) level, the data transmitted from the input IC 11 consist only of dummy data, as shown in FIG. 4.

Next, (step S250) a decision is made as to whether a halt command has been received from the CPU 39. If a halt command has been received, processing proceeds to step S220, while otherwise processing proceeds to S260, in which a decision is made as to whether the trigger signal TG sent from the input IC 11 is at the high level.

If the trigger signal TG is not at the high level then processing proceeds to step 250, while if TG is at the high level then processing proceeds to S270.

In step S270, the value expressing the successive number of times that the A-type command is to be transmitted (which has been written into the register 41 by the CPU 39 in executing step S150 of FIG. 5, as the value 5 with this embodiment) is read out from the register 41, and is decremented by 1, and the result is written into the register 41 as an updated number of times that the A-type command is to be transmitted. In step S280, a decision is made as to whether as to whether the result of the subtraction in step S270 is zero.

If the result is not zero, then operation then returns to step S240, while if it is zero, then processing proceeds to step S290.

The communication section 31 of the processing IC 13 performs the processing of steps S240 to S280 five times in succession, starting from the point at which the chip select signal CS goes to the low level, and as a result, the A-type command is transmitted five times in succession to the input IC 11 while correspondingly the processing IC 13 receives five successive sets of data from the input IC 11. The processing performed in steps S240 to S280 corresponds to the processing contents of the portion enclosed by the broken-line outline K2 in FIG. 4, described above as the operations (2) to (9).

Next (step S290), the same data receiving operation is performed as for step S240, however instead of transmitting an A-type command to the input IC 11, a B-type command (held in the register 43 as cmdB transmission data, which were written therein in step S150 of FIG. 5 by the CPU 39) is transmitted to the input IC 11.

Next in step S300 a decision is made as to whether or not a halt command has been received from the CPU 39. If a halt command is received then processing proceeds to step S220, while if a command is not received, processing proceeds to step S310. In step S310 a decision is made as to whether the trigger signal TG is at the high level, and if TG is not at the high level, operation then returns to step S300, while if TG is at the high level (YES decision in S310) then processing proceeds to step S320.

Hence, the communication section 31 of the processing IC 13 performs processing to transmit a B-type command to the input IC 11 in the sixth communication interval, after five successive A-type commands have been transmitted to the input IC 11 in the first five communication intervals after the chip select signal CS went to the low (active) level. As this B-type command is being transmitted from the processing IC 13, it receives a cmdA response data set whose contents notify the processing IC 13 of the results achieved from the immediately precedingly transmitted A-type command (i.e., which was transmitted in the fifth communication interval). These results include the actual values that have been set by the control section 25 of the input IC 11 for the input channel (ch0 or ch1) that is selected by the multiplexer 19, and the actual value of gain that has been set for the amplifier 21. These are the set values that are judged, to detect abnormality, in step S170 of FIG. 5 described above.

The processing performed in steps S290 to S310 in FIG. 6 corresponds to the operations (10) described above, and to the contents of the broken-line outline K3 in FIG. 4.

Next, in step S320, the same data transmitting and receiving operations are performed as in step S290, with the same B-type command again being transmitted to the 11. However in this case, while the B-type command is being transmitted by the communication section 31 of the processing IC 13 to the communication section 15 of the input IC 11, the communication section 31 receives a cmdB response data set from the communication section 15. This contains the first (compensated) knock sensor signal A/D value, and is first stored in the register 45, then the two leading bits are removed and the remaining 14-bit data, expressing the knock sensor signal A/D value, are transferred to the digital filter 35 for processing.

Next in step S330, a decision is made as to whether a halt command has been received from the CPU 39. If a halt command is received then processing proceeds to step S220, while if a halt command has not been received, step S340 is then executed. In step S340 a decision is made as to whether the trigger signal TG is at the high level, and if TG is not at the high level, operation then returns to step S330, while if TG is at the high level (YES decision in S340) then operation returns to step S320, in which the same data transmitting and receiving operations are concurrently performed as described above, i.e., a B-type command is transmitted to the input IC 11, and in parallel with this a cmdB response data set is received by the processing IC 13 from the input IC 11.

The processing performed in steps S320 to S340 in FIG. 6 corresponds to the operations (11), (12) described above, i.e., corresponds to the processing shown within the broken-line outline K4 in FIG. 4, to derive each of the knock sensor signal A/D values of a knock judgement interval.

The processing executed by the input IC 11 will be described referring to the flow diagrams of FIGS. 7 and 9. This processing is performed based on cooperation between the communication section 15 and the control section 25 of the input IC 11.

Figure 7:
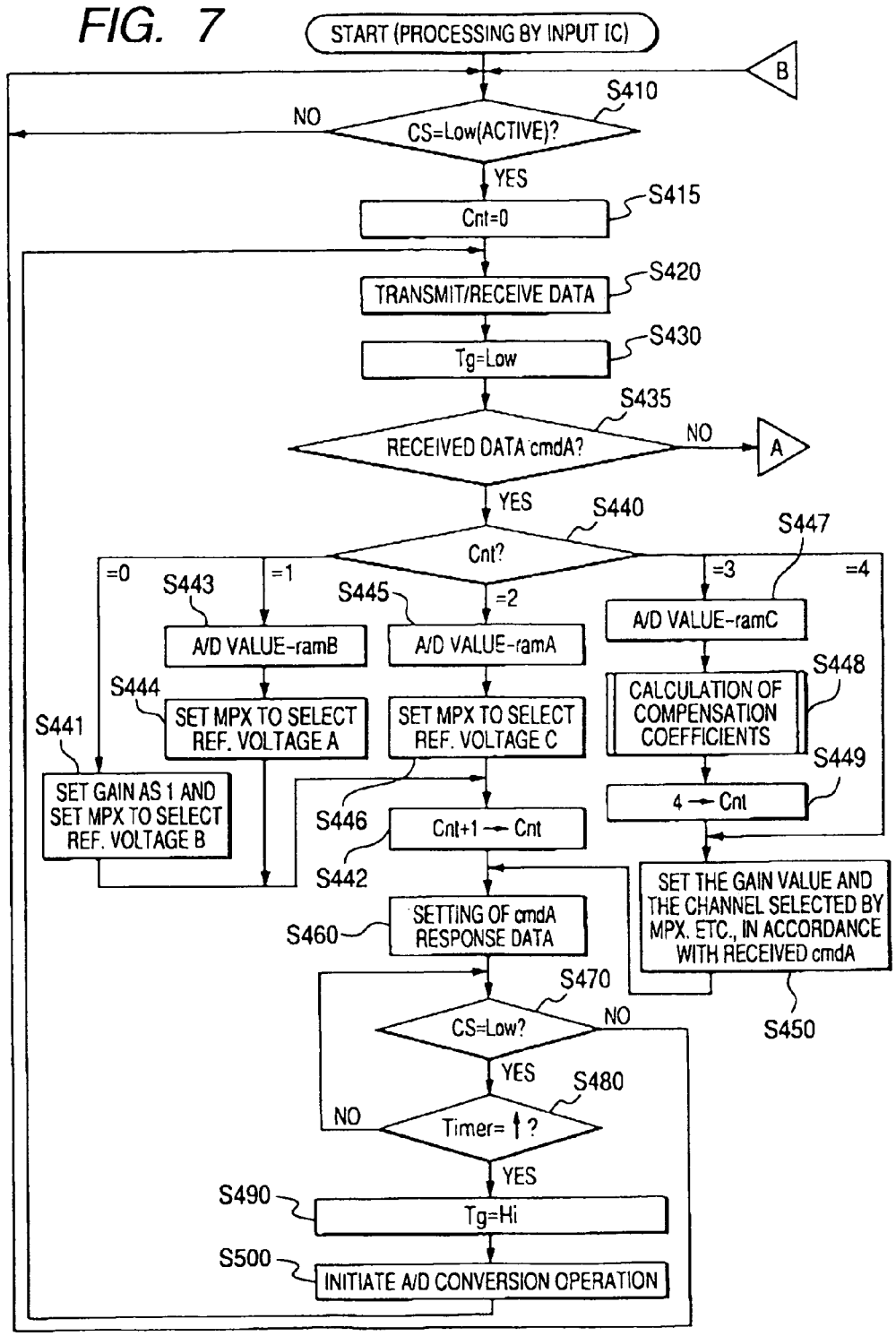
FIG. 7 is a first flow diagram for describing processing performed by the input IC, with the first embodiment.

Referring to FIG. 7, firstly in step S410 the input IC 11 judges whether or not the chip select signal CS is at the low level. If that signal is at the high level, then the processing waits until CS goes to the low level. When the signal CS is judged to be at the high level (YES in step S410), processing proceeds to step S415 in which a count value Cnt is initialized to zero. This is a count of the number of communication operations performed (i.e., in successive communication intervals within this data communication period) since the chip select signal CS went to the low level.

Next step S420 is executed, in which concurrent transmitting and receiving of serial data are performed in synchronism with the communication clock signal CLK, supplied from the processing IC 13 via the signal line 2. As described above, in each communication interval, 16 bits constituting an A-type command or a B-type command are received from the processing IC 13 via the signal lines 2 or 3, one bit at a time and stored in the received data register 47, while in parallel with this, 16 bits constituting a cmdA response data set or a cmdB response data set are read out from the transmission data register 46 and transmitted via the signal line 4 from the communication section 15 of the input IC 11 to the processing IC 13, one bit at a time. Also as described above, the cmdA response data set which is transmitted from the input IC 11 in the first communication interval after the chip select signal CS goes to the low level conveys only dummy data.

When the concurrent transmitting and receiving of 16 bits has been completed, processing proceeds to step S430, in which the trigger signal TG is set to the low level. Hence, in the first execution of the processing of FIG. 7 after the chip select signal CS has gone to the low level, i.e., when the count value Cnt is zero, the trigger signal TG is set at the low level, as shown in FIG. 4.

Next in step S435, a decision is made as to whether the leading two bits of the received 16 bit data (the command code) are [10], indicating that an A-type command has been received. If the received data constitute an A-type command then processing proceeds to step S440 in which a decision is made as to which of the values 0, 1, 3 and 4 is the current value of the count Cnt.

If it is found that the count value Cnt is 0, then since this indicates that the communication operation performed in step S420 was the initial communication operation of a data communication period, processing proceeds to step S441 in which a value of 1 is set for the gain of the amplifier 21, and the input channel corresponding to the reference voltage B is specified to be selected by the multiplexer 19.

Next, processing proceeds to step S442, in which the count value Cnt is incremented by one, and step S460 is then executed.

If it is found in step S440 that the count value Cnt is 1, then since this indicates that the communication operation performed in the immediately preceding execution of step S420 was the second communication operation, processing proceeds to step S443 in which an A/D value derived by the A/D converter 17 during this second communication interval is stored in memory, designated as ramB. This derived value is the A/D value of reference voltage B, which was derived (referring to FIG. 4) after the first timer signal was detected, that is, after the first YES decision was reached in a preceding execution of step S480 as described in the following. Following step S443, step S444 is executed, in which the input channel selected by the multiplexer 19 is set as that of the reference voltage A.

Next, processing proceeds to step S442 in which the count value Cnt is incremented by one, then step S460 is executed.

If it is found in step S440 that the count value Cnt is 2, then since this indicates that the communication operation performed in the immediately preceding execution of step S420 was the third communication operation, processing proceeds to step S445 in which an A/D value derived by the A/D converter 17 during this third communication interval is stored in memory, designated as ramA. This derived value is the A/D value of reference voltage A, which was derived (referring to FIG. 4) after the second timer signal was detected (in the immediately preceding execution of step S480). Following step S445, step S446 is executed, in which the input channel selected by the multiplexer 19 is set as that of the reference voltage C.

If it is found in step S440 that the count value Cnt is 3, then since this indicates that the communication operation performed in the immediately preceding execution of step S420 was the fourth communication operation of this data communication period, processing proceeds to step S447 in which an A/D value derived by the A/D converter 17 during the fourth communication interval is stored in memory, designated as ramC. This is the A/D value of reference voltage C, which was derived (referring to FIG. 4) after the third timer signal was detected (in the immediately preceding execution of step S480). Following step S447, step S448 is executed, in which compensation coefficient calculation processing is performed (as described hereinafter referring to FIG. 9A), to obtain compensation coefficients for use in compensating respective A/D values of a sensor signal which are subsequently derived. The compensation coefficients are calculated based on the A/D values obtained for the reference voltages A, B, C (stored as ramA, ramB and ramC) in relation to the corresponding logical (ideal) A/D values.

Next, operation proceeds to step S449, in which the count value Cnt is set at a maximum (guard) value of 4, and step S450 is then executed.

If it is found in step S440 that the count value Cnt is 4, then since this indicates that the communication operation of the preceding execution of step S420 was the fifth communication operation of this data communication period, operation proceeds to step S450. In step S450, the input channel that is to be selected by the A/D converter 19, and the gain value for the amplifier 21, are each set in accordance with the contents of the A-type command that was received in the immediately preceding execution of step S420. Operation then proceeds to step S460.

The setting operations performed in step S450 serve as preparatory adjustments, before A/D conversions of the appropriate knock sensor signal begin to be successively performed in the succeeding knock judgement interval.

In step S460, a cmdA response data set is generated and stored in the transmission data register 46, in preparation for being transmitted. When step S460 is performed following step S450, the contents of the cmdA response data set specify the input channel that has actually been selected by the A/D converter 19, and the gain that has actually been set for the amplifier 21. When that cmdA response data set is transmitted in the succeeding execution of step S420, the data contents serve to report to the processing IC 13 these actually set values, enabling the processing IC 13 to verify (in step S170 of FIG. 5) that these correspond to the values specified in the A-type command.

Next, operation proceeds to step S470, in which a decision is made as to whether the chip select signal CS remains at the low level. If CS has gone to the high level, then operation returns to step S410, while if CS is at the low level then operation proceeds to step S480 in which a decision is made as to whether a timing signal has been newly outputted from the timer circuit 23. As described above, these timing signals are successively produced at 10 microsecond intervals, beginning after the chip select signal CS has gone to the low level as shown in FIG. 4. If a timing signal has not been newly outputted, the operation returns to step S470, while if a timing signal has been newly outputted, operation proceeds to step S490.

In step S490, the trigger signal TG produced from the communication section 15 is changed from the low to the high level, then in step S500, an A/D conversion operation by the A/D converter 17 is initiated (i.e., an operation which is completed within this communication interval) on the signal supplied from the multiplexer 19 via the selected input channel.

As a result of the trigger signal TG going to the high level, the processing IC 13 is enabled to receive data transmitted from the input IC 11. In the first execution of step S420 that is performed following execution of step S450, the aforementioned cmdA response data set generated in step S460 (expressing the selected input channel of the multiplexer 19 and the gain that has been set for the amplifier 21) is transmitted to the processing IC 13.

Figure 13:
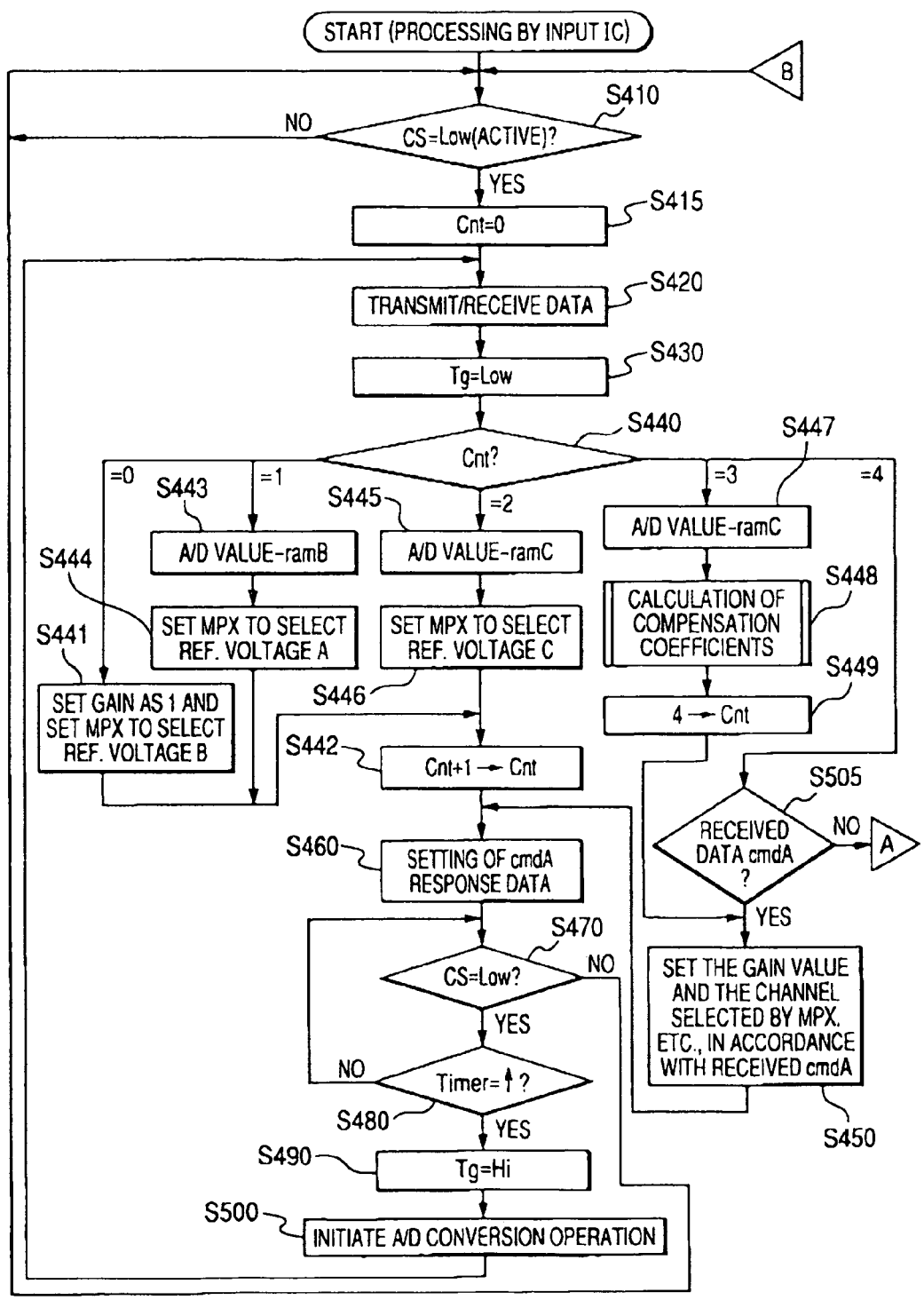
FIG. 13 is a flow diagram for use in describing a third embodiment.

It can thus be understood (referring to FIG. 4) that A/D conversion of the reference voltage B is performed during the second communication interval, A/D conversion of the reference voltage A is performed during the third communication interval, and A/D conversion of the reference voltage C is performed during the fourth communication interval, while during the fifth communication interval, an A/D conversion is performed in step S500 of FIG. 13, however the result of that operation is not utilized by the processing IC 13. In that fifth communication interval, either the input channel ch0 or ch1 is set as the input channel that is selected by the multiplexer 19, i.e., the input channel which is specified in the A-type commands, and the gain value for the amplifier 21 is set as specified in the A-type commands.

The processing of steps S440 to S500 is repetitively performed so long as successive A-type commands are received by the input IC 11, as detected in step S435 This processing corresponds to the contents of the broken-line outline K2 in FIG. 4.

Figure 8:
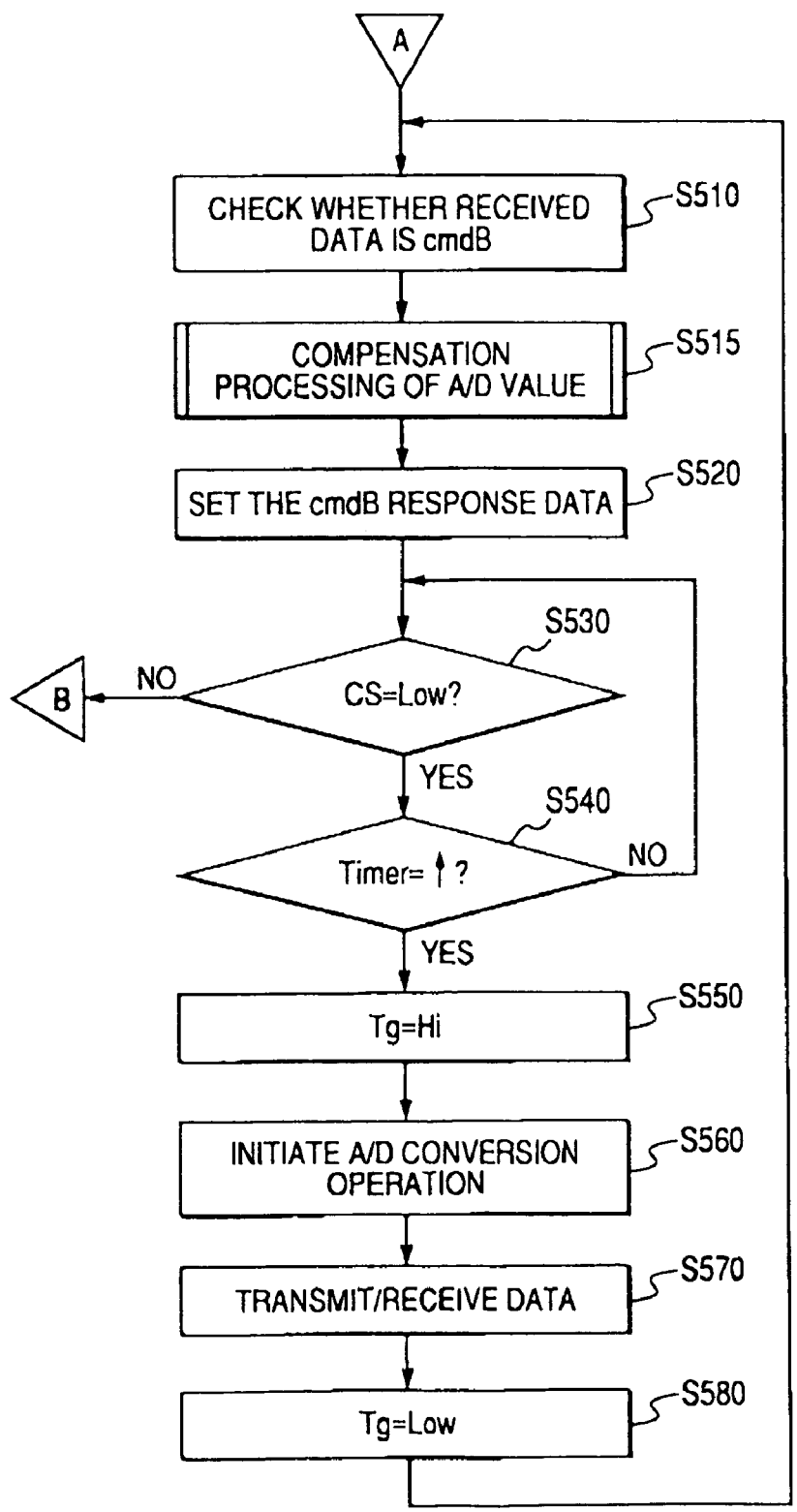
FIG. 8 is a second flow diagram for describing processing performed by the input IC, with the first embodiment.

If it is judged in step S435 that the data received from the processing IC 13 in the most recent execution of step S420 are not an A-type command, then operation proceeds to step S510 of FIG. 8, to verify that the received data are a B-type command. Hence, only simple judgement of received data is necessary, since only two types of command can be transmitted from the processing IC 13 to the input IC 11. i.e., an A-type command or a B-type command.

In step S510 of FIG. 8, a decision is made as to whether the received data are actually a B-type command, with the decision being based on confirming that both of the leading two bits of the received data constitute the command code of a B-type command, i.e., that these bits are [01]. If this is not found to be the case, then since this indicates that the received data are neither an A-type command nor a B-type command, an abnormality report is stored with contents indicating "occurrence of abnormality whereby received command which should be a B-type command is not such a command".

Next, in step S515, the compensation processing of FIG. 9B (described hereinafter) is performed, in which the compensation coefficients (calculated in the aforementioned step S448, which has already been completed by this stage) are used to apply compensation to the most recently derived knock sensor signal A/D value produced from the A/D converter 17.

Next, in step S520, in preparation for the next data transmission, a cmdB response data set is generated which contains the compensated A/D value that has been derived in step S515, and which is then stored in the transmission data register 46.

Next, in step S530, a decision is made as to whether the chip select signal CS remains at the low (active) level. If CS is not at the low level then operation then returns to step S410 of FIG. 7, while if CS is still at the low level then operation proceeds to step S540. In step S540 a decision is made as to whether a timing signal has been newly outputted from the timer circuit 23. If a timing signal has not yet been newly outputted, the operation then returns to step S530, while if a timing signal has been newly outputted then operation proceeds to step S550.

In step S550, the trigger signal TG is changed by the communication section 15 from the low to the high level, then in step S560, an A/D conversion operation by the A/D converter 17 is initiated. Next, in step S570, in the same way as described for step S420, serial data transmission and receiving with respect to the processing IC 13 are performed in synchronism with the communication clock signal CLK, supplied from the processing IC 13 via the signal line 2. In this case, the cmdB response data set which was stored in the transmission data register 46 in the preceding execution of step S520 is transmitted to the processing IC 13, while a B-type command is transmitted to the input IC 11 from the processing IC 13. In addition, during this communication interval, the A/D conversion operation which has been initiated in step S560 as described above, continues until completion.

When transmitting/receiving of respective sets of 16 bits has been completed in step S570, operation proceeds to step S580 in which the trigger signal TG is set at the low level, and operation then returns to step S510.

As a result, when it is judged in step S435 that the received data are not an A-type command, and hence constitute a B-type command, then after completing step S510 the processing sequence of steps S510 to S580 is repetitively performed until it is judged in step S530 that the chip select signal CS has returned to the high level. During these repetitions, each time that a timing signal is outputted from the timer circuit 23, the input IC 11 receives a B-type command from the processing IC 13, while in parallel with this, a cmdB response data set conveying a compensated knock sensor signal A/D value is transmitted to the processing IC 13. This processing sequence of steps S510 to S580 corresponds to the operations within the outline K4 in FIG. 4.

Figure 9A:
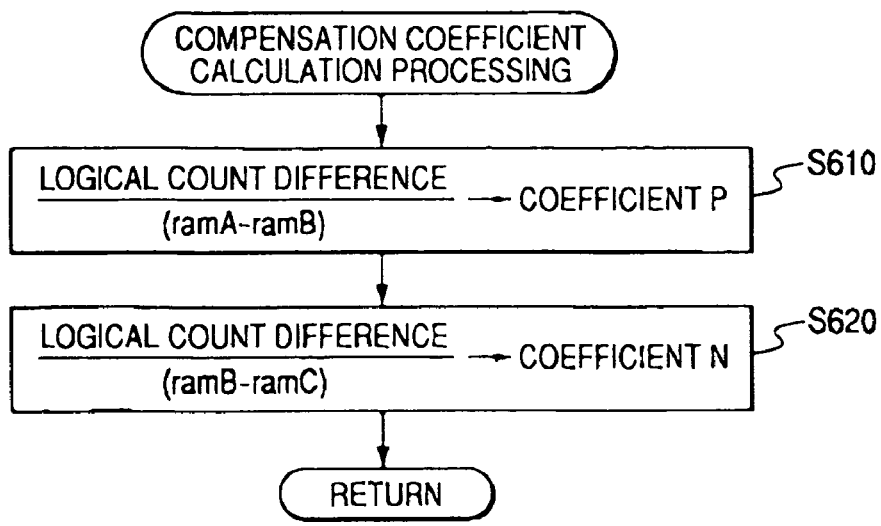
FIGS. 9A, 9B are flow diagrams respectively showing compensation coefficient calculation processing and compensation processing, performed with the first embodiment.

FIG. 9A is a flow diagram showing the compensation coefficient calculation processing that is executed as step S448 of FIG. 7. In this processing, firstly in step S610, a positive-side compensation coefficient P is calculated, using the following equation (1). In the succeeding step S620, a negative-side compensation coefficient N is calculated, using the following equation (2).

$$\text{compensation coefficient } P = (\text{logical count difference})/(ramA - ramB) \quad (1)$$

$$\text{compensation coefficient } N = (\text{logical count difference})/(ramB - ramC) \quad (2)$$

The positive-side compensation coefficient P is used to compensate an A/D value produced from the A/D converter 17 when that value is positive, i.e., when the amplitude of the knock sensor signal (expressed as an A/D value) is higher than the central voltage. Similarly, the negative-side compensation coefficient N is used to compensate an A/D value produced from the A/D converter 17 when that value is negative, i.e., when the amplitude of the knock sensor signal (expressed as an A/D value) is lower than the central voltage.

ramA is the A/D value that is stored as the value of reference voltage A in step S445 of FIG. 7, while ramB is the A/D value that is stored as the value of reference voltage B in step S443 of FIG. 7, and ramC is the A/D value that is stored as the value of reference voltage C in step S447 of FIG. 7.

More specifically, the compensation coefficient P is calculated as the ratio of the difference between the respective logical (i.e., ideally correct) A/D values of the reference voltages A and B to the difference between the actually obtained A/D values of the reference voltages A and B. Similarly, the compensation coefficient N is calculated as the ratio of the difference between the respective logical A/D values of the reference voltages B and C to the difference between the actually obtained A/D values of the reference voltages B and C.

Furthermore as described above, the A/D converter 17 of this embodiment is based on a plurality of series-connected circuits functioning as respective delay stages, with the input analog signal being applied as a common supply voltage of the delay stages. Each A/D value of the analog signal is obtained as a count of a total number of delay stages traversed by a pulse signal during a fixed interval, i.e., with this count value being proportional to the voltage of the analog signal. In equation (1) above, the "logical count difference" obtained for two analog voltage values signifies the difference between the respective count values that would be obtained for these voltages (as A/D values from the A/D converter 17) in the absence of A/D conversion error, i.e., difference between the logical count values for these voltages.

With this embodiment, the relationships between the values of reference voltages A, B and C are such that the equations (1) and (2) should ideally provide the same result, i.e., 1.25V (expressed as a logical count value).

For example if each count value consists of 16 bits, and the range of variation of the input analog signal is from 0V to 5V, then, each change by one in the count value (i.e., a change in state of the LSB) should corresponds to a change of 5 V divided by $2^{16}$, i.e., 76 microvolt. Thus when the input voltage is 1.25 V (the reference voltage C), the resultant count value that is obtained as the A/D value from the A/D converter 17 should ideally be 16384, i.e., the logical count value should be 16384.

As a specific example:
Analog signal voltage: 3.75 V Logical count value: 49152
Actual count value: 45031
Analog signal voltage: 2.5 V Logical count value: 32768
Actual count value: 30000
Analog signal voltage: 1.25 V Logical count value: 16384
Actual count value: 15105.

In that case, the compensation coefficient P is obtained as (49152−32768)/(45031−30000)=1.09, while the compensation coefficient N is obtained as (49152−32768)/(45031−30000)=1.10

Figure 9B:
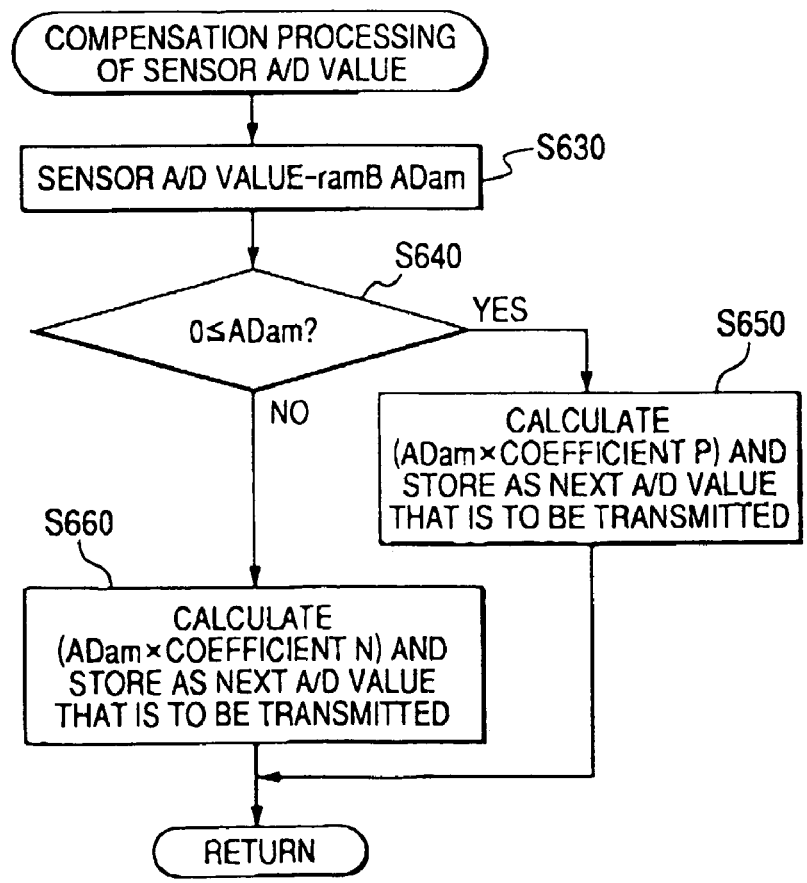

FIG. 9B is a flow diagram of the compensation processing that is executed in step S515 of FIG. 8. As shown, firstly in (step S630), the calculation of equation (3) below is applied to the A/D value obtained from the A/D converter 17, to convert that to a value expressing the amplitude of the knock sensor signal.

$$ADam = \text{sensor } A/D \text{ value} - ramB \tag{3}$$

As described above the central voltage of signals transferred via each of the input channels ch1, ch0 is set at the output voltage from the buffer circuit 20 (nominally equal to reference voltage B (2.5 V). By subtracting the A/D value of reference voltage B from each knock sensor signal A/D value produced from the A/D converter 17, using equation (3), the knock sensor signal A/D values are converted to actual amplitude values (ADam), i.e., with the +2.5 V offset removed.

Next in step S640 of FIG. 9B, a decision is made as to whether the value ADam is greater than zero. If so, then operation proceeds to step S650, while if ADam is less than zero, operation proceeds to step S660. In step S650, ADam is multiplied by the positive-side compensation coefficient P, derived in step S610, and the multiplication result is stored as the compensated A/D value portion of a cmdB response data set, in the transmission data register 46, to be then transmitted to the processing IC 13. Operation then returns to step S520 of FIG. 8. In step S660, ADam is multiplied by the negative-side compensation coefficient N, derived in step S620, and the multiplication result is stored as the compensated A/D value portion of a cmdB response data set, in the transmission data register 46, to be then transmitted to the processing IC 13. Operation then returns to step S520 of FIG. 8, and the stored cmdB response data set is subsequently transmitted in the next execution of step S570.

For example when the input voltage to the A/D converter 17 is 3.125 V, if the actual resultant count value from the A/D converter 17 were 37516, then ADam would be obtained as (37516−30000)=7516

This is a positive value, so that step S650 would then be executed, to obtain the compensated A/D value 8192(=7516×1.09), for transmission to the processing IC 13.

This can be verified using the logical count value (32768) for a 2.5 V analog value, as:

(8192+32768)×(5 v/$2^{16}$)=3.125

Thus with this first embodiment, from a point immediately before the start of a knock judgement interval for a cylinder until the end of that knock judgement interval (i.e., corresponding to the section K4 of FIG. 4) successive A/D conversion operations are performed on the knock sensor signal corresponding to that cylinder (more specifically with the above embodiment, corresponding to the cylinder bank of that cylinder) at fixed periodic intervals, by the A/D converter 17 of the input IC 11. In addition, during that knock judgement interval, digital filter processing is applied to the successively derived compensated A/D values of the knock sensor signal (i.e., which occur in a fixed periodic sequence along the time axis) by the digital filter 35 of the processing IC 13. The results obtained from the digital filter processing are used to judge whether knocking is occurring in the cylinder concerned.

Furthermore during an interval that elapses between the end of a knock judgement interval for one cylinder and the start of a knock judgement interval for the next cylinder in the firing sequence, the A/D converter 17 performs A/D conversions of predetermined DC reference voltages (with the above embodiment, respectively designated as reference voltages A, B and C), the A/D values of these reference voltages are used to calculate compensation coefficients P and N, for use in compensating each of the knock sensor signal A/D values that will be derived in the succeeding knock judgement interval. The resultant successive compensated knock sensor signal A/D values are transmitted to the processing IC 13, which performs the aforementioned digital filter processing of these compensated A/D values.

It can thus be understood that with the first embodiment described above, before successive A/D conversions of a knock sensor signal at fixed periodic intervals are started, for any one of the cylinders, a type of learning processing is performed whereby the apparatus derives appropriate values for the compensation coefficients P and N, i.e., values which will ensure that a sufficient degree of accuracy is attained for the compensated A/D values that are subjected to digital filter processing, irrespective of variations in the conversion accuracy of the A/D converter.

As a result, when the operation of the A/D converter 17 is affected by variations in operating temperature and/or variations in power supply voltage, accurate compensated A/D values can be obtained for the knock sensor signal. Hence, accurate knock judgement can be performed based on the digital filter processing results obtained by the digital filter 35.

Furthermore, with the first embodiment, the processing to calculate values for the compensation coefficients P, N is newly performed before the start of each knock judgement interval, i.e., immediately before the calculated values are used in performing compensation processing of successive A/D values during that knock judgement interval. Hence, even if a time interval of appreciable duration occurs between the end of a knock judgement interval for one cylinder and the start of knock judgement interval for the succeeding cylinder (start of acquisition of knock sensor signal A/D values for the succeeding cylinder), since the compensation coefficients P and N that are utilized during the knock judgement interval for that succeeding cylinder are calculated immediately prior to the start of that knock judgement interval, accurate compensation of the knock sensor signal A/D values can be achieved even if short-term variations occur in the conversion characteristics of the A/D converter 17.

Furthermore with the first embodiment, since updated values for the compensation coefficients P and N are calculated at each ignition timing of the engine, the effects of variations in operating temperature and supply voltage can be minimized.

Moreover with the first embodiment, since the compensation coefficients P, N do not change during each knock judgement interval, i.e., the same compensation coefficients are applied to each of the knock sensor signal A/D values derived during a knock judgement interval, continuity of the digital filter processing results can be ensured.

Furthermore, in order to achieve accurate knock judgement, it is necessary to accurately detect small-amplitude variations in the knock sensor signal. For that reason, with the first embodiment, a reference voltage B of 2.5 V (the central voltage of a knock sensor signal that is inputted to the A/D converter 17) is one of the reference voltages which are utilized in calculating the compensation coefficients P and N. Hence, small-amplitude variations in a knock sensor signal with respect to that central voltage can be accurately reflected in the series of compensated A/D values of that sensor signal. This further serves to ensure that accurate knock judgement can be achieved.

Moreover with the first embodiment, in addition to the reference voltage B, other reference voltages (reference voltages A and C) are also utilized, with these having respective values (3.75 V, 1.25 V) that are intermediate between the upper limit value (+5 V) and the lower limit value (0 V) of the range of possible variation of input analog voltages to the A/D converter 17. As a result, a high degree of accuracy of A/D conversion can be achieved for small-amplitude variations in the knock sensor signal with respect to the central voltage of that signal. This further serves to ensure that accurate knock judgement can be achieved.

The permissible range of analog input voltage to the A/D converter 17 (0 V to 5 V) is preferably made identical to the range of amplitude variation of a knock sensor signal. As described above, the A/D converter 17 of the first embodiment is a circuit in which each output A/D value is obtained as a count of a number of delay stage traversed during a fixed interval, with the input analog voltage being applied as the supply voltage of each of the delay stages. In general, the relationship between input analog voltage and the A/D conversion error for such a type of A/D converter is as illustrated by the full-line curve in the graphs of FIG. 10. It is assumed in FIG. 10 that the range of analog input signal variation (range of power supply voltage of the A/D converter) is 0 V to 5 V.

Figure 10:
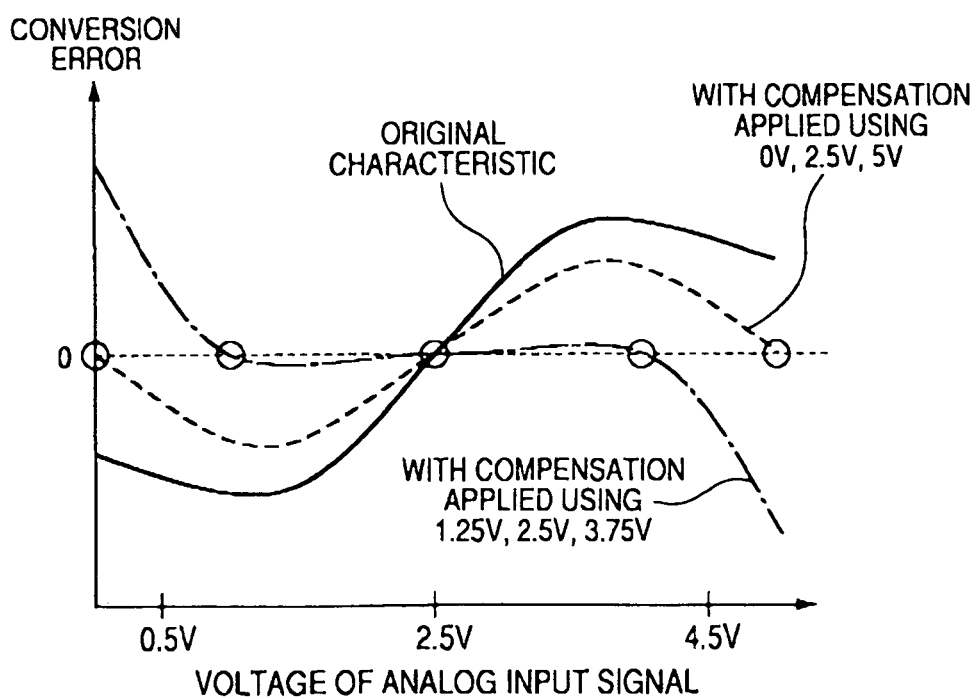
FIG. 10 is a graph showing relationships between A/D conversion error characteristics.

If the reference voltage A were to be made identical to the upper limit value of range of analog input signal variation (i.e., 5 V) and the reference voltage C were to be made the lower limit value (i.e., 0 V), and only these values were to be used in calculating the compensation coefficients P and N, then the relationship between the input voltage and the conversion errors in the resultant compensated A/D values would be as shown by the broken-line curve in FIG. 10. As shown by that characteristic, when the analog input voltage of the A/D converter is close to its upper limit value or close to its lower limit value, the A/D conversion error is small. However for values of input voltage that are in a range between the lower limit value and the center value (2.5 V), or between the center value and the upper limit value, it can be seen that the conversion accuracy is not substantially increased by applying compensation.

However with the first embodiment, in which the reference voltage C is set as a value (1.25 V) intermediate between the lower limit value and the center value of the input voltage range, and the reference voltage A is set as a value (3.75 V) intermediate between the center value and the upper limit value of input voltage range of the A/D converter, and in which the compensation coefficients P and N are calculated using these values A and C in conjunction with the center reference voltage B, accurate compensation can be achieved over a substantial range of variation of the input voltage, as illustrated by the chain-line characteristic in FIG. 10.

Specifically, as can be understood from the characteristics shown in FIG. 10, high A/D conversion accuracy can be achieved for values of input voltage that are close to the center value (2.5 V) of the input voltage variation range Hence by setting the reference voltages A and C at values that are respectively intermediate between the center value and the upper limit value of that range and intermediate between the center value and the lower limit value of the range, it is ensured that a sufficiently high level of conversion accuracy can be achieved when the amplitude of the input voltage of the A/D converter (i.e., amount of difference of that voltage from the center value of 2.5 V) is small.

Furthermore with the first embodiment, only A-type commands and B-type commands are transmitted from the processing IC 13 to the input IC 11. An A-type command specifies the input channel that is to be selected for A/D conversion of a knock sensor signal, the value of gain that is to be set for the amplifier 21, etc. The input IC 11 performs successive operations for deriving A/D values of the reference voltages A, B, C and then an operation for transmitting information to the processing IC 13 reporting the input channel that has actually been selected by the A/D converter 17 and the gain that has actually been set for the amplifier 21, with these operations being successively performed in response to receiving respective ones of a predetermined plurality of successive A-type commands from the processing IC 13 at the start of a data communication period (i.e., with the above embodiment, five successive A-type commands, as shown in FIG. 4). In particular, processing to calculate the compensation coefficient is performed by the input IC 11 in response to receiving the fourth successive A-type command.

However it should be noted that it would be equally possible for the apparatus to be configured whereby respectively separate commands are transmitted from the processing IC 13 to designate the input channel to be selected by the A/D converter 17 and the gain value to be set for the amplifier 21. In that case, the input IC 11 can be configured to respond to receiving a predetermined one of these commands (after the chip select signal CS has gone to the low level) by performing the processing to calculate the compensation coefficients.

Second Embodiment

A second embodiment of a signal processing apparatus will be described in the following. By comparison with the first embodiment, the second embodiment differs in that the processing performed by the communication section 31 of the processing IC 13 is changed from that of FIG. 6 to that of FIG. 11A, and in that the processing performed by the input IC 11 processing IC 13 is changed from that of FIG. 7 to that of FIG. 11B. In the following, only those parts of the second embodiment which are different from those of the first embodiment will be described.

Figure 11A:
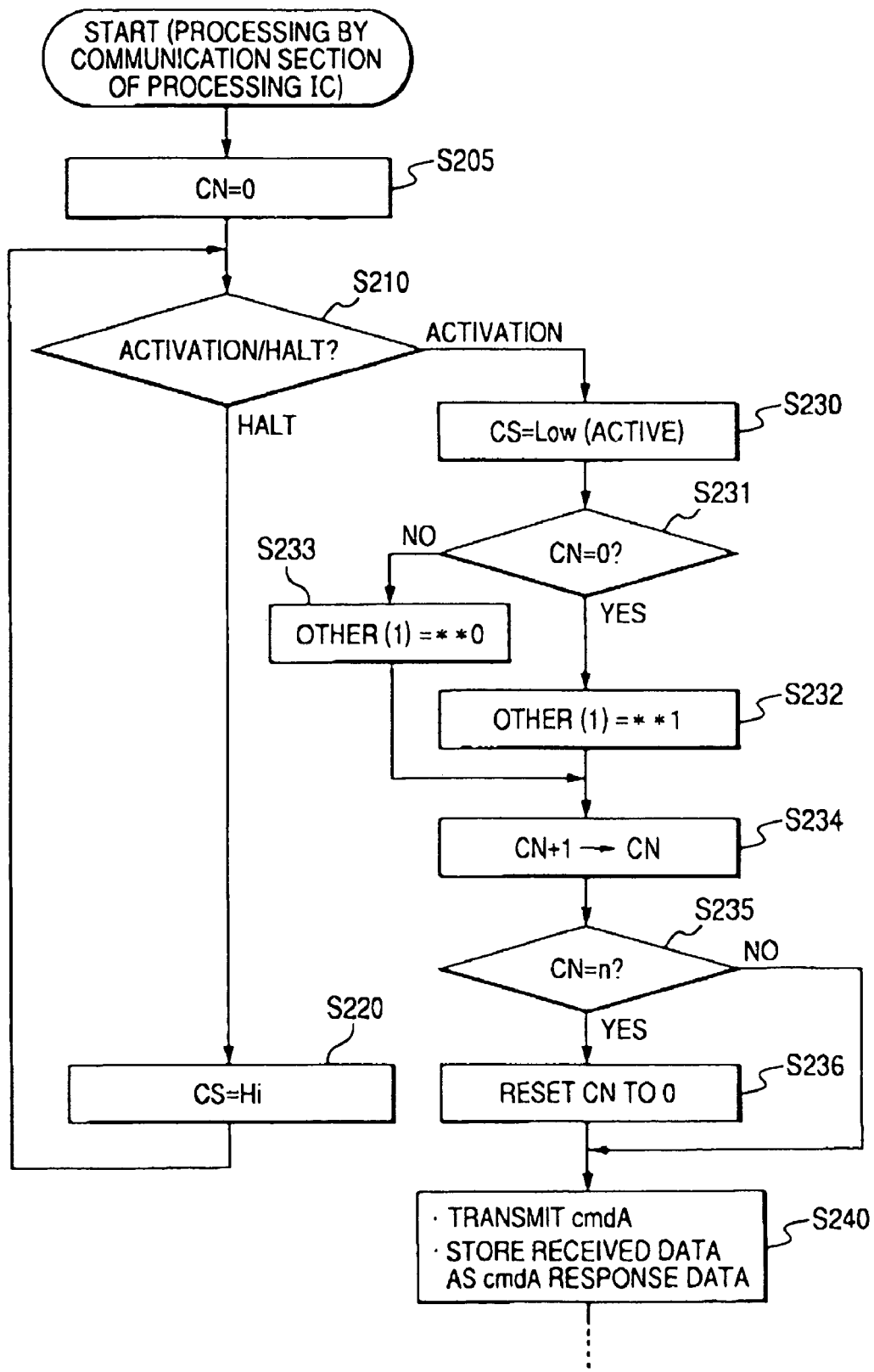
FIGS. 11A, 11B are flow diagrams for describing the operation of a second embodiment of a knock sensor signal processing apparatus.

Firstly, with the second embodiment as shown in FIG. 11A, the steps S205, and S231 to S234 are added to the processing. When operation of the communication section 31 of the processing IC 13 begins, firstly in step S205, the count value Cnt is initialized to zero, then processing proceeds to step S210. If it is found in step S210 that an activation command has been received from the CPU 39, then operation proceeds to step S230, in which the chip select signal CS is set to the low level, then operation proceeds to step S231. In step S231, a decision is made as to whether the count value CN is zero, and if so, operation proceeds to step S232, in which the low-order bit of the data in the portion "other" (see FIG. 2A) of the cmdA transmission data held in the register 42 (to be transmitted as an A-type command) is set to 1.

However if it is judged in step S231 that the count value CN is not zero, then operation proceeds to step S233 in which the low-order bit of the data in the portion "other" of the cmdA transmission data held in the register 42 is set to 0.

After execution of step S232 or S233, operation proceeds to step S234 in which the count value CN is incremented by one. However if this causes the value of CN to attain a predetermined value n, then CN is reset to zero. Operation then proceeds to step S240.

As a result of the above operations, each time the chip select signal CS has changed from the high to the low level for n times in succession (i.e., once in every n ignition timings of the engine), the low-order bit of the portion "other" of an A-type command that is transmitted from the processing IC 13 to the input IC 11 becomes set to the value 1.

Figure 11B:
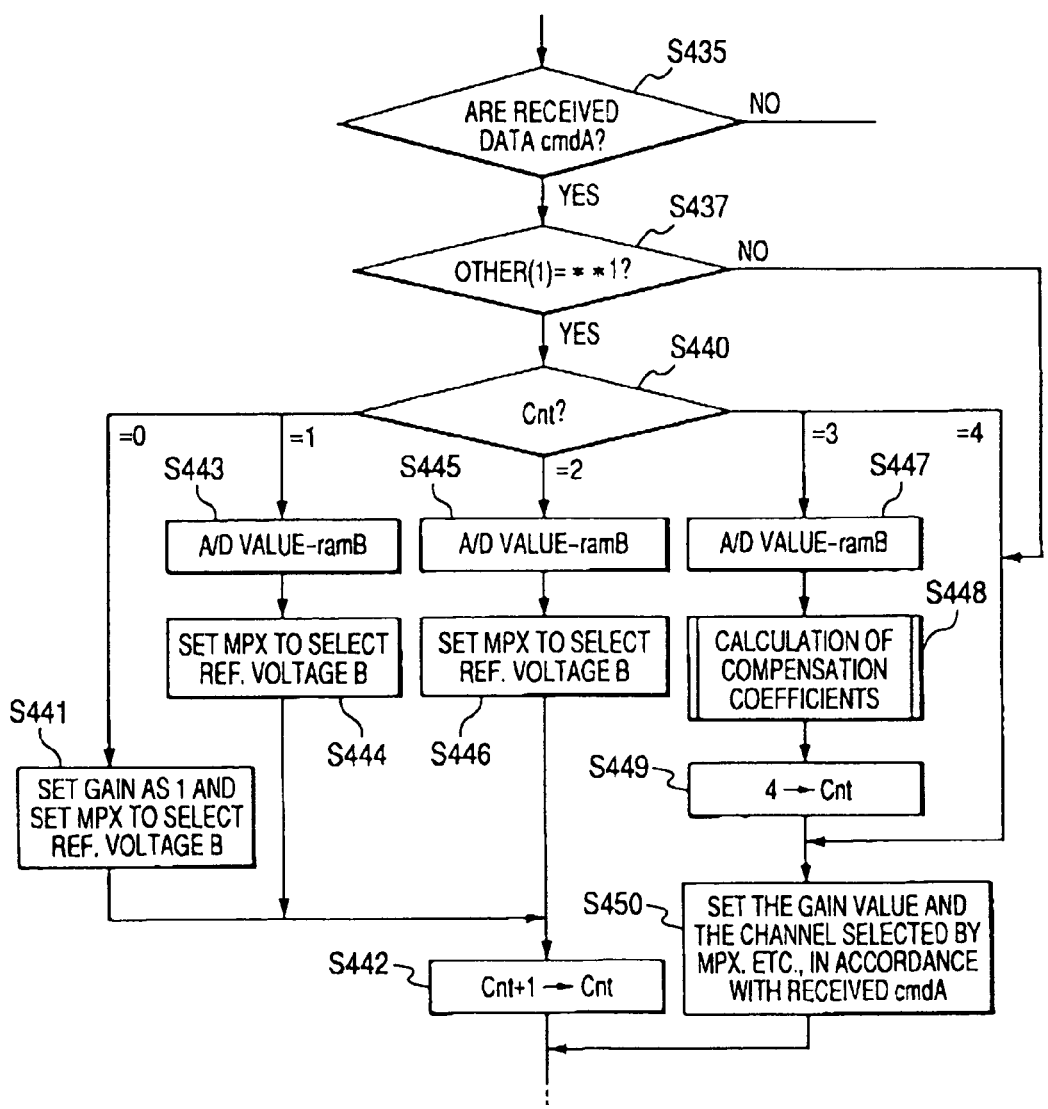

In addition the processing executed by the second embodiment, as shown in FIG. 11B, differs from that of FIG. 7 in that a step S437 is added. In this case, when the input IC 11 judges (in step S435) that the currently received data is an A-type command, operation proceeds to step S437. In step S437, a decision is made as to whether the low-order bit of the portion "other" of the received A-type command is 1. If so, operation proceeds to step S440, while if it is not 1, operation proceeds directly to step S450.

Thus with the second embodiment, the input IC 11 calculates respective values for the compensation coefficients P and N once in every n ignition timings of the engine, as opposed to calculating these once at every ignition timing as with the first embodiment. Hence, by selecting an appropriate value for n, the frequency of calculating the compensation coefficients P and N can be reduced by comparison with the first embodiment, while achieving a sufficient reduction of the effects of temperature variations upon the A/D conversion accuracy.

For example in the case of a 6-cylinder 4-stroke engine, if the value of n is made 6, then the values for the compensation coefficient P and N will be calculated once in each cycle of the engine.

Figure 12:
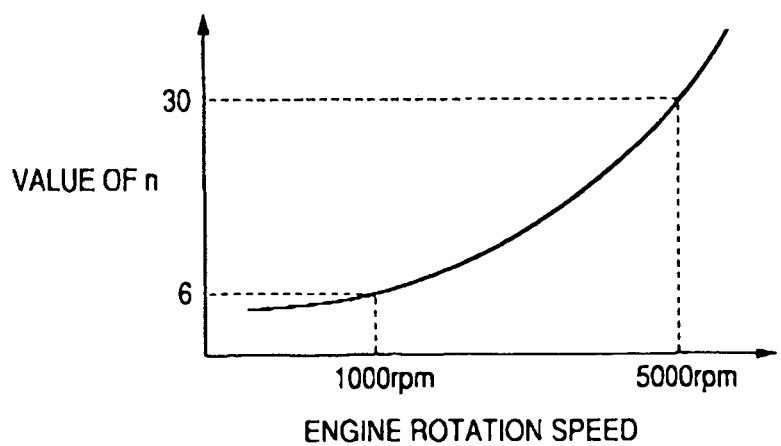
FIG. 12 is a graph for use in describing the second embodiment.

Furthermore, as shown in FIG. 12, it is possible to determine an appropriate value for n based on the current speed of rotation of the engine. The higher the speed of rotation, the higher is made the value of n.

That is to say, when the engine is rotating at high speed, so that the duration of each interval between successive knock judgement intervals becomes short, it is advantageous to reduce the frequency of calculating updated values of the compensation coefficients P and N, by increasing the value of n.

In particular, it is possible to select the value of n in accordance with the engine speed of rotation as described above, in such a way that the repetition period of updating the compensation coefficients P, N is made independent of engine speed. This will render the compensation performance less affected by operating temperature variations.

For example, in the case of a 6-cylinder engine when rotating at 1000 rpm, the time taken for the crankshaft to rotate through 120° CA is 20 ms, while when the engine is rotating at 5000 rpm, the time taken to rotate through 120° CA is 4 ms. Hence, by making the value of n equal to 6 when the engine speed is 1000 rpm, and making the value of n equal to 30 when the engine speed is 5000 rpm, updated values for the compensation coefficients P and N will be calculated once in every 120 ms, with that updating interval being independent of the engine speed.

Third Embodiment

Figure 14:
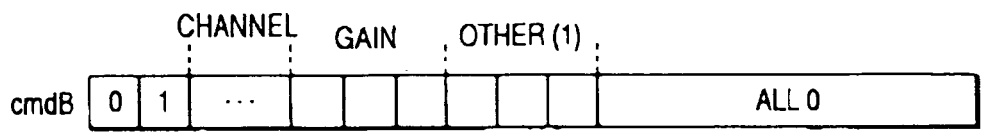
FIG. 14 is a diagram of the data format of a B-type command that is used with the third embodiment.

A third embodiment of a signal processing apparatus will be described in the following. By comparison with the first embodiment, the third embodiment differs in that the processing of FIG. 7 of the first embodiment is changed to that shown in the flow diagram of FIG. 13. In addition, with the third embodiment as shown in FIG. 14, each B-type command that is transmitted from the processing IC 13 to the input IC 11 has the same format as an A-type command, and differs from an A-type command only in the command code (leading two bits). Specifically, with the third embodiments each cmdB response data set conveys the gain value to be set for the amplifier 21, the input channel that is to be selected by the multiplexer 19, etc. In the following, only the points of difference between the third and the first embodiment will be described.

As shown in FIG. 13, with the third embodiment, the judgement step S435 of FIG. 7 (for judging the type of the currently received command) is eliminated, with processing proceeding directly from step S430 to step S440. In place of step S435, the corresponding judgement step S505 is added. This is executed when it is judged in step S440 that the count value Cnt is 4, signifying that the current communication interval is occurring later than the fourth communication interval, i.e., occurs after a fourth successive command has been received from the processing IC 13 (subsequent to the chip select signal CS going to the low level).

With the first embodiment, when it is judged in step S440 of FIG. 7 that the value of Cnt is 4, then the input channel that is selected by the multiplexer 19 and the gain of the amplifier 21, etc. are respectively set in accordance with the contents of the latest A-type command (detected in step S435). If the received data are not an A-type command then they are judged to constitute a cmdB response data set, and so operation proceeds to step S510 of FIG. 8 described above.

With the third embodiment, even if the input IC 11 begins to receive successive type-B commands (after the chip select signal CS goes to the low level) before four successive A-type commands have been received, the operations of steps S441, and S443, S444, etc., will be successively executed, and when a type-B command is detected in step S505 (in the fifth communication interval), the first of successive A/D conversions of the appropriate sensor signal will begin.

Thus with the third embodiment, when the input IC 11 judges in step S440 that the count value Cnt is 3, i.e., that the fourth communication with the processing IC 13 (since the chip select signal CS went to the low level) has been completed, then S450 is thereafter executed (following steps S447, S449). When it is then judged in step S440 that Cnt has become 4, and also judged in step S505 that a B-type command is received, then operation proceeds to step S510 of FIG. 8, to perform the first sensor signal A/D conversion.

If the vehicle engine suddenly accelerates, this may make it necessary for each knock judgement interval (i.e., interval of acquisition of knock sensor A/D values) for the next cylinder to immediately began at the end of the knock judgement interval for the preceding cylinder. In that case, the processing IC 13 temporarily ceases to transmit all or part of each series of five successive A-type commands prior to each knock judgement interval (i.e., immediately after each high-to-low transition of the chip select signal Cs) and instead transmits type-B commands in place of these A-type commands. However with the third embodiment, it is ensured that reliable calculation of accurate values for the compensation coefficients P, N will be maintained, and that each of the newly acquired sensor signal A/D values will be compensated by using the most recently calculated compensation coefficients P, N.

Fourth Embodiment

Figure 19:
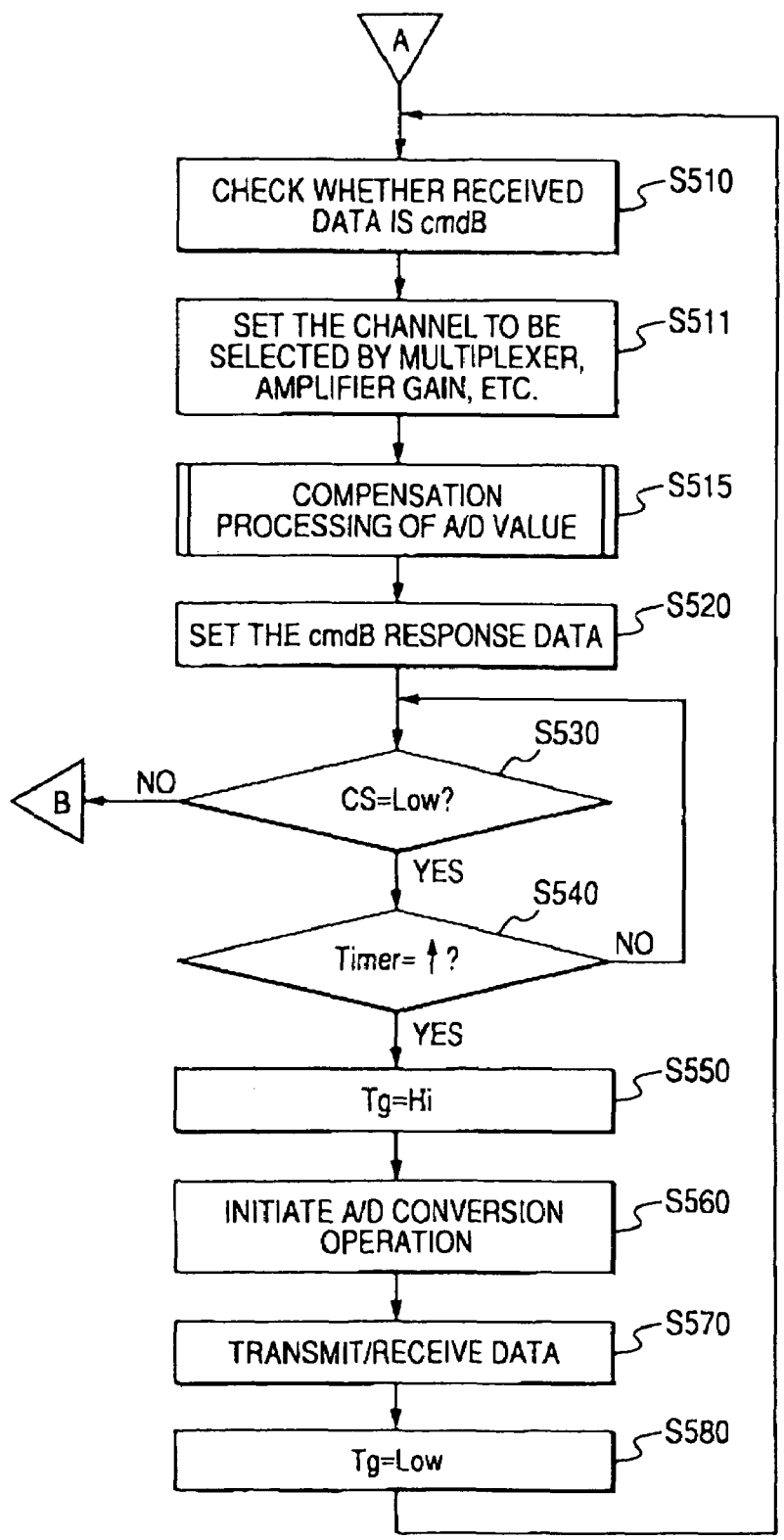
FIG. 19 is a flow diagram for describing the operation of a fourth embodiment; and, FIG. 20 is a flow diagram for describing the operation of the fifth embodiment.

A fourth embodiment of a signal processing apparatus will be described in the following. By comparison with the first embodiment, the fourth embodiment differs in that the format of a B-type command is identical to that of the third embodiment (see FIG. 14), and in that the processing of FIG. 19 is executed in place of that of FIG. 8. As shown in FIG. 19, an additional step S511 is inserted following step S510. In step S510, the same processing is executed as for step S450 of FIG. 7, but with information being obtained from a received B-type command, that is to say, the gain of the amplifier 21 and the input channel selected by the multiplexer 19 are determined in accordance with the contents of the B-type command that has been received in the current execution of the data communication step S420.

Thus with the fourth embodiment, when the chip select signal CS goes to the low level, if the processing IC 13 has started to transmit B-type commands before the input IC 11 has calculated updated values of the compensation coefficients P, N in step S448 (i.e., if less than four A-type commands are successively transmitted from the processing IC 13 following a high-to-low transition of the chip select signal CS), operation proceeds from step S435 to step S510 when the first of the B-type commands is received by the input IC 11. Thus, the operation for calculating the compensation coefficients P, N is omitted, and execution of A/D conversions of a knock sensor signal by the A/D converter 17 at periodic intervals in response to successive B-type commands is initiated.

In that case, the most recently derived value for ramB and most recently previously calculated compensation coefficients P, N are used in the compensation processing of step S515.

Thus with the fourth embodiment, in a condition (e.g., sudden acceleration of the engine) in which it is necessary for acquisition of knock sensor A/D values for a cylinder to rapidly commence after the chip select signal CS has gone to the low level, the processing IC 13 can immediately start to transmit B-type commands to the input IC 11 from that time point or shortly thereafter. When the first B-type command is received by the input IC 11, then when step 435 is executed, operation proceeds to step S510 of FIG. 19, and the first knock sensor A/D value is thereafter derived in step S560. Hence, the input IC 11 can rapidly begin to supply successive knock sensor signal A/D values to the processing IC 13.

Fifth Embodiment

Figure 20:
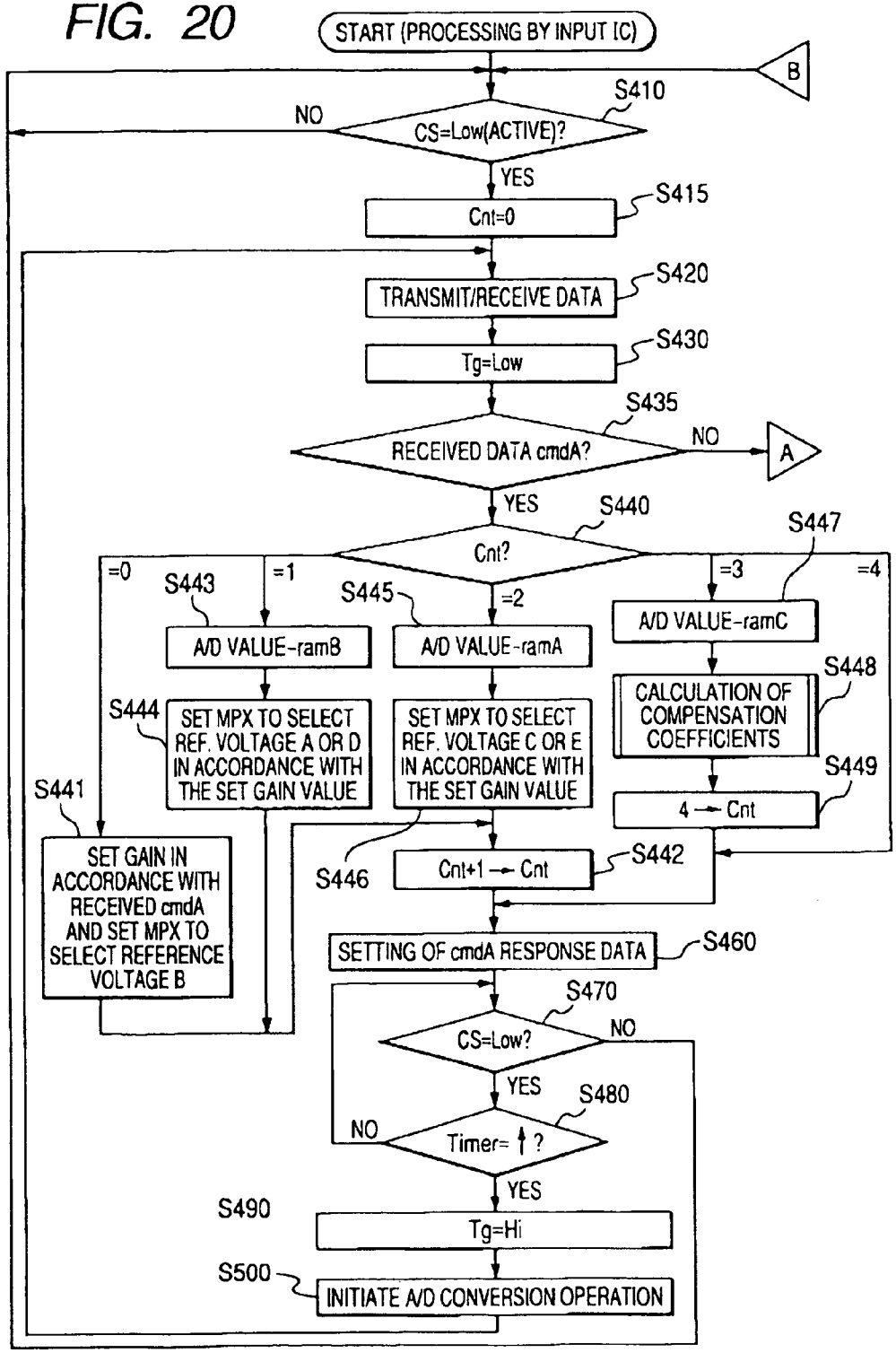

With the first embodiment processing is executed by the input IC 11 whereby, after the chip select signal Cs has gone to the low level, the gain of the amplifier 21 is fixed at a value of 1 until the completion of respective A/D conversions of the reference voltages A, B and C, to be used in calculating the compensation coefficients P and N. With a fifth embodiment, the first embodiment is modified in that instead of setting the gain of the amplifier 21 to a fixedly predetermined value when the first A-type command is received in a data communication period (i.e., in step S441 of FIG. 7), the gain value is set (in a step which replaces step S441 of FIG. 7) in accordance with the contents of the A-type command that has been received in the current execution of step S420. In that case, it is unnecessary to again set the gain value in step S450 of FIG. 7. FIG. 20 is a flow diagram of the operation of the fifth embodiment.

Figure 15:
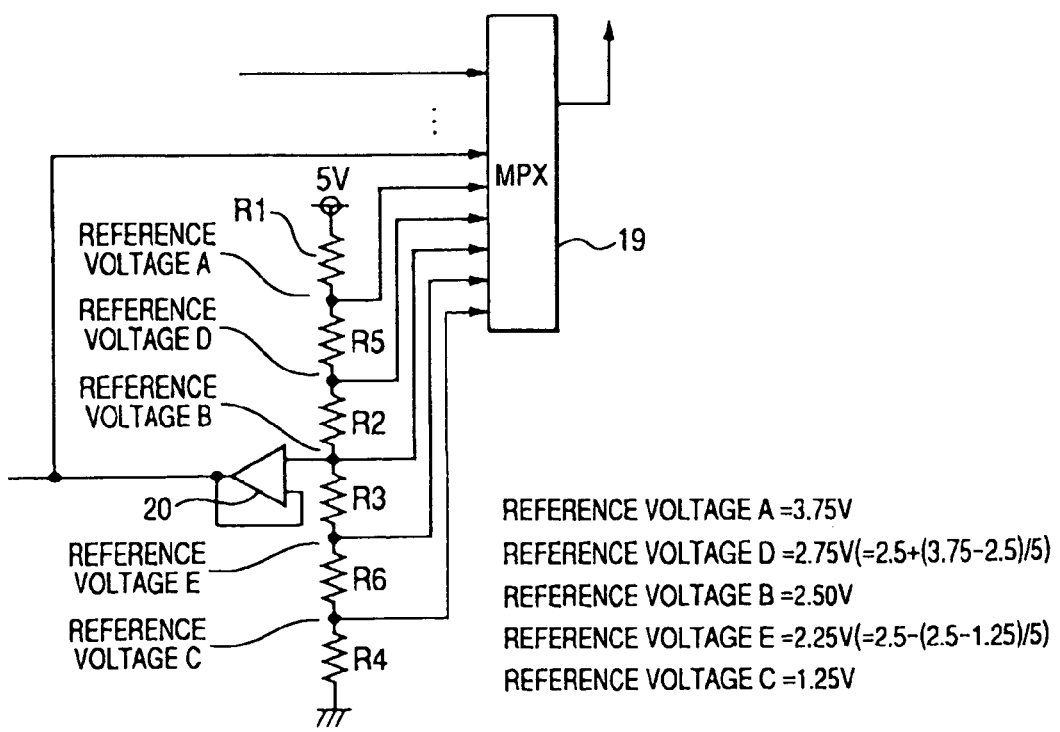
FIG. 15 is a partial circuit diagram for use in describing a fifth embodiment, and a first alternative embodiment.

With the fifth embodiment, the voltage divider formed of the resistors R1, R2, R3 of FIG. 1 of the first embodiment is changed to the form shown in FIG. 15, made up of six series-connected resistors R1 to R6, to produce the output voltages 3.75 V, 2.75 V, 2.5 V, 2.25 V and 1.25 V from the 5 V power supply voltage. These output voltages are inputted to respective channels of the multiplexer 19, with the voltage 2.75 V being designated as the reference voltage D and the voltage 2.25 V being designated as the reference voltage E in FIG. 15.

The reasons for providing the additional reference voltages E (1.25 V) and D (2.75 V) are as follows. As described hereinabove, the amplifier 21 amplifies with respect to the reference voltage B (2.5 V) as an offset, i.e., the output voltage is obtained as:

Reference voltage $B$+{(input voltage−reference voltage $B$)×amplifier gain}

With the first embodiment, the amplifier gain is set as 1 when the respective A/D values of the reference voltages A, B and C are derived (when the second to third A-type commands are received, as shown in FIG. 4). Hence, the difference between two reference voltages can be directly divided by the difference between the A/D values obtained for these, to obtain a compensation coefficient as described hereinabove. However with the fifth embodiment, the gain may have been set at a value other than 1, when the A/D values of the reference voltages A, B and C are being derived. Thus it is no longer possible to directly use respective A/D values obtained for the reference voltages, in calculating the compensation coefficients P and N.

Hence with the fifth embodiment, when A/D conversion of a reference voltage A, B or C (i.e., 3.75 V, 2.5 V or 1.25 V) is performed, the multiplexer 19 is controlled to select an input voltage to the amplifier 21 which will result in the logical (i.e., correct) A/D value of that specific reference voltage being outputted from the A/D converter 17.

This will be described assuming for example that the gain of the amplifier 21 can be switched to either 1 or 5. Firstly, if the gain is set as 5, then the input voltage to the amplifier 21 that will result in the logical value of reference voltage A (3.75 V) being produced from the amplifier 21 is obtained as:

2.75 V(=2.5 V+(3.75−2.5)/5)

Hence in this case to obtain a correct A/D value corresponding to the reference voltage A, the multiplexer 19 is controlled to select the input channel corresponding to the reference voltage D.

Similarly, the input voltage to the amplifier 21 that will result in the logical value of reference voltage C (1.25 V) being produced from the amplifier 21 is obtained as:

2.25 V(=2.5 V−(2.5−1.25)/5)

Hence in this case to obtain a correct A/D value corresponding to the reference voltage C, the multiplexer 19 is controlled to select the input channel corresponding to the reference voltage E.

In the case of the reference voltage B (2.5 V), the logical value of that voltage is always outputted from the amplifier 21 when the input voltage value of 2.5 V is supplied to the amplifier 21, irrespective of the gain of the amplifier 21, and so the reference voltage B is directly selected to be inputted to the amplifier 21, to obtain the corresponding A/D value from the A/D converter 17.

Thus with this embodiment, if the gain of the amplifier 21 has been set as 5 in step S441 of FIG. 20, then in the subsequent step S444, the input channel of the multiplexer 19 corresponding to the reference voltage D is selected, so that an input voltage of 2.75 V is supplied to the A/D converter 17, and the A/D value corresponding to reference voltage A is obtained. Similarly, in step S446, the input channel corresponding to the reference voltage E is selected, so that an input voltage of 2.25 V is supplied to the A/D converter 17 and hence the A/D value corresponding to reference voltage C is obtained.

However if the gain of the amplifier 21 is set as 1 in step S441, then the input channel of the multiplexer 19 corresponding to the reference voltage A (3.75 V) is selected in step S444, while the input channel corresponding to the reference voltage C (1.25 V) is selected in step S446.

Thus with this embodiment, each time the chip select signal CS has gone to the low level, the gain of the amplifier 21 is set (to a value that is specified in the first of the five successive A-type commands shown in FIG. 4) before beginning processing to derive the compensation coefficients P and N in step S448 (i.e., the compensation coefficient processing routine shown in FIG. 9A).

As a result, this embodiment provides the advantage that the compensation coefficients calculated in step S448 of FIG. 7, when applied in the compensation processing of step S515 in FIG. 8, also compensate each sensor signal A/D value for the effects of deviations of the actual gain of the amplifier 21 from the specified value.

Alternative Embodiment 1

With the first embodiment, before a knock sensor signal is inputted to the A/D converter 17, the central voltage about which the knock sensor signal varies is set as the output voltage of the buffer circuit 20, which is set a value (nominally 2.5 V) that is one half of the power supply voltage (5 V) of the apparatus However alternatives to this could be envisaged. Firstly, with the circuit shown in FIG. 15, the output voltage from the buffer circuit 20 could be applied to one of the input channels of the multiplexer 19 in the input IC 11. In that case, with the output voltage from the buffer circuit 20 designated as reference voltage F, the control section 25 of the input IC 11 controls the multiplexer 19 to select the reference voltage F during the first communication interval after the chip select signal CS goes to the low level. The resultant A/D value of the reference voltage F is then stored as the value ramF.

Furthermore with this alternative embodiment, in step S630 of the compensation processing routine of FIG. 9B, in place of the equation (3) described above, calculation is performed in accordance with the following equation (4):

ADam=sensor A/D value−ramF        (4)

Thus, the output voltage of the buffer circuit 20 (which is the actual central voltage about which the knock sensor signal varies) is converted to an A/D value by the A/D converter 17, and the resultant A/D value (ramF) is subsequently used in calculating compensated knock sensor signal A/D values. In that way, by accurately subtracting from each knock sensor signal A/D value the actual DC level which was set as the central voltage (by applying the output voltage of the buffer circuit 20 via the resistor 59 as described hereinabove) prior to performing A/D conversion, the compensated A/D values accurately express successive actual amplitude values of the knock sensor signal, irrespective of variations in the operating characteristics (for example, variations in offset voltage) of the buffer circuit 20.

Alternative Embodiment 2

With each of the above embodiments, after the end of a knock judgement interval for a cylinder, the compensation coefficients P and N are calculated after the A/D values of the reference voltages A, B, C have been derived, immediately before starting A/D conversions of the knock sensor signal for the next cylinder. However, as illustrated in FIG. 16, it would be equally possible to derive the compensation coefficients P and N at the end of a knock judgement interval for a cylinder, for use in applying compensation to a knock sensor signal during the next knock judgement interval, for the next cylinder.

In that case, even if there are engine speed variations whereby the acquisition of the knock sensor signal for a cylinder must rapidly begin after completion of the knock judgement interval for the preceding cylinder, accurate updated values for the compensation coefficients P and N can be calculated and appropriate compensation applied to the knock sensor signal A/D values for each cylinder.

Figure 16:
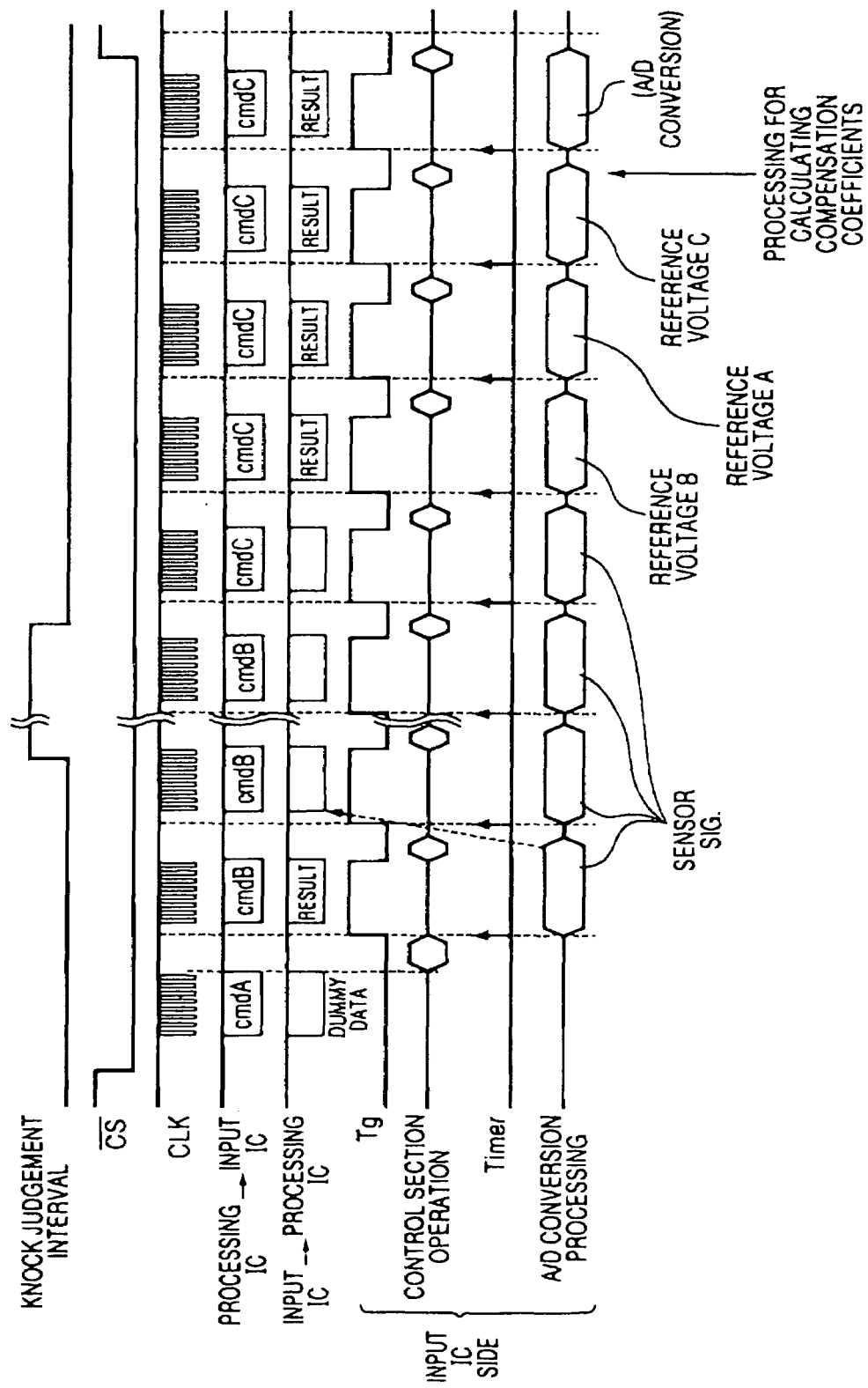
FIG. 16 is a timing diagram for use in describing a second alternative embodiment.

With the example of FIG. 16, on completion of a knock judgement interval for a cylinder (i.e., after the last of the successive knock sensor signal A/D values has been received by the processing IC 13), a third type of command, which will be referred to as a type-C command (designated as cmdC in FIG. 16) is transmitted from the processing IC 13 to the input IC 11. With the example of FIG. 16, five successive type-C commands are transmitted respectively, in a final five communication intervals after completion of a knock judgement interval (more specifically, after a final knock sensor signal A/D value has been transmitted in a knock judgement interval, but before the chip select signal CS then returns to the inactive level and actual knock judgement processing is then performed by the processing IC 13, as described hereinabove). In response, the input IC 11 initiates a compensation coefficient updating operation to derive updated values for the compensation coefficients P and N (in the same manner as is performed for the first embodiment in response to receiving five successive A-type commands), with A/D values of the reference voltages B, A and C being respectively derived in response to the second, third and fourth transmissions of the type-C command as shown in FIG. 16.

After completion of deriving the compensation coefficients P and N, the chip select signal CS is changed from the low to the high level. Subsequently, the processing IC 13 performs the processing of steps S120 to S160 in FIG. 5, and thereafter, the chip select signal CS goes from the high to the low level.

When this occurs, the processing IC 13 sends a single A-type command to the input IC 11 (i.e., during the first communication interval), and thereafter transmits successive B-type commands to the input IC 11, with resultant compensated sensor signal A/D values being received from the input IC 11 as described for the first embodiment.

Alternative Embodiment 3

As illustrated in FIGS. 17A, 17B respectively, it is also possible to configure the input IC 11 to perform a plurality of A/D conversions of each of the reference voltages A, B and C, to then derive the average of each of the plurality of values thereby obtained for each reference voltage, and to subsequently use these average values (i.e., as ramA, ramB, ramC) in calculating the compensation coefficients P and N in the processing of FIGS. 9A, 9B above.

With such a configuration, even if the input voltage applied to the A/D converter 17 contains noise components while A/D conversion of the reference voltages is being performed, the effects of the noise on the calculated values of the compensation coefficients P and N can be minimized.

In the example of FIG. 17A, each reference voltage is subjected to three successive A/D conversions, while in the example of FIG. 17B, the three reference voltages B, A, C are successively calculated, with that operation being performed three times in succession.

Alternative Embodiment 4

With a fourth alternative embodiment, as illustrated in FIG. 18, the input IC 11 derives respective values for each of the compensation coefficients P and N three times in succession. The average of the three values obtained for coefficient P is then calculated, and similarly the average of the three values obtained for the coefficient N is then calculated, and these average values of P and N are thereafter applied in the compensation processing of FIG. 9B.

This can provide similar effects to those described for alternative embodiment 3 above.

Furthermore it would be possible to derive each of the compensation coefficients P1, N1, etc., shown in FIG. 18 by using average values of the reference voltages A, B. C as described above referring to FIGS. 17A or 17B. In that case, after a knock judgement interval has been completed for a cylinder and before beginning the knock judgement interval for the succeeding cylinder, average values of the reference voltages A, B. C would be derived, then used to calculate each of the three successive pairs of compensation coefficients P1, N1, P2, N2, P3, N3 of FIG. 18.

The respective average values of P1, P2, P3 and of N1, N2, N3 would then be calculated, to obtain average compensation coefficients P and N. These would then be used in compensation of sensor signal A/D values in the immediately succeeding knock judgement interval.

As an alternative to the operation shown in FIG. 18, it would be possible to use a configuration whereby in each data communication period, each of the compensation coefficients P and N are calculated once, then the averages of each of these newly calculated values and respective values of P, N that were derived in one or more preceding data communication periods are then calculated, with the resultant average values of P and N being then used to compensate the knock sensor signal A/D values obtained in the succeeding knock judgement interval.

It should also be noted that the invention is not limited to using simple averaging processing, and that it would be equally applicable for example to utilize smoothing calculations to derive average (smoothed) values.

It should thus be noted that although the invention has been described with reference to specific embodiments, the scope claimed for the invention is not limited to these embodiments, and various modifications or alternative configurations for these could be envisaged, which lie within the scope of the invention.

For example, the invention is not limited to use with a knock sensor that is a vibration sensor, and would be equally applicable for use with a type of knock sensor which detects changes in pressure within an engine cylinder, or a sensor which produces a signal indicative of ion currents.

Furthermore the sequence in which the reference voltages A, B, C are A/D converted is not limited to that shown in FIG. 4, i.e., B to A to C. This could for example be from A to B to C, etc.

Furthermore, the processing of FIG. 5 is not limited to being performed once each time a 30° CA timing is reached, and could equally be performed each time that some other predetermined crankshaft angular position is reached, for example 10° CA.

Moreover in the processing of FIG. 5, it would be equally possible to convert the angular values attained by the crankshaft into time values, and use a free-running timer to activate the processing. That is to say, each time a time interval corresponding to a predetermined amount of crankshaft angular rotation has elapsed, a timer interrupt would be generated, causing the processing of FIG. 5 to be started.

What is claimed is:

1. A knock sensor signal processing apparatus for operating on a knock sensor signal that is produced from a knock sensor of a internal combustion engine having a plurality of cylinders, to perform filter processing of said knock sensor signal and detect occurrence of knocking in a cylinder based on results of said filter processing, comprising
an A/D (analog-to-digital) converter,
an A/D converter control circuit for controlling said A/D converter to convert said knock sensor signal to successive A/D values at fixed periodic intervals,
compensation value calculation means for performing a compensation coefficient updating operation of controlling said A/D converter to convert a DC reference voltage having a known voltage level to a corresponding A/D value and calculating a compensation coefficient based on said A/D value,
compensation means for utilizing said compensation coefficient to apply compensation to each of said A/D values of said knock sensor signal, to obtain successive compensated A/D values, and
a digital filter for performing filter processing of said successive compensated A/D values;
wherein;
said A/D converter control circuit is adapted to control said A/D converter to perform said A/D conversions of said knock sensor signal at predetermined periodic intervals during each of respective knock judgement intervals for respective cylinders, and
said compensation value calculation means is adapted to perform said compensation coefficient updating operation during an interval between a termination of said successive knock sensor signal A/D conversions within a first one of said knock judgement intervals and a commencement of said successive knock sensor signal A/D values conversions within an immediately succeeding one of said knock judgement intervals, with a compensation coefficient obtained by said updating operation being applied in compensating said knock sensor signal A/D values derived in said succeeding knock judgement interval.

2. A knock sensor signal processing apparatus according to claim 1, wherein said compensation value calculation means is adapted to perform said compensation coefficient updating operation immediately prior to said commencement of deriving successive knock sensor signal A/D values within said immediately succeeding knock judgement interval.

3. A knock sensor signal processing apparatus according to claim 1, wherein said compensation value calculation means is adapted to perform said compensation coefficient updating operation immediately following said termination of said first knock judgement interval.

4. A knock sensor signal processing apparatus according to claim 1, wherein said compensation value calculation means is adapted to perform said compensation coefficient updating operation once for each ignition occurrence of said engine.

5. A knock sensor signal processing apparatus according to claim 1, wherein said compensation value calculation means is adapted to perform said compensation coefficient updating operation once in every n ignition occurrences of said engine, where n is an integer of value 2 or greater.

6. A knock sensor signal processing apparatus according to claim 5, wherein said compensation value calculation means is adapted to increase said value of n in accordance with an increase in rotation speed of said engine.

7. A knock sensor signal processing apparatus according to claim 1, wherein said compensation means is adapted to perform said compensation of each of said successively derived A/D values during each of said knock judgement intervals, by utilizing a compensation coefficient value that is held unchanged throughout said knock judgement interval.

8. A knock sensor signal processing apparatus according to claim 1, wherein said voltage level of said DC reference voltage is predetermined to ensure increased accuracy of compensation of said knock sensor signal A/D values when an amplitude of said knock sensor signal is within a range of low values, by comparison with an accuracy of compensation that is obtained when said amplitude is within a range of high values.

9. A knock sensor signal processing apparatus according to claim 8, wherein said voltage level of said DC reference voltage is predetermined to be located between a highest value and a lowest value in a permissible range of analog input voltage levels of said A/D converter.

10. A knock sensor signal processing apparatus according to claim 9, wherein said A/D converter comprises a plurality of series-connected semiconductor circuits functioning as respective delay stages, and wherein said analog input voltage is applied as a common power supply voltage of each of said delay stages.

11. A knock sensor signal processing apparatus according to claim 8, comprising a plurality of reference voltages, wherein one of said reference voltages is a central voltage value of said knock sensor signal.

12. A knock sensor signal processing apparatus according to claim 1, comprising a first apparatus incorporating said A/D converter, said A/D converter control means, said compensation value calculation means and said compensation means, and a second apparatus incorporating said digital filter;
wherein
said first apparatus is adapted to initiate a plurality of successive sensor signal A/D conversion operations at fixed periodic intervals and to supply resultant A/D values of said knock sensor signal to said second apparatus, in response to a request command transmitted from said second apparatus, and
said A/D converter control means of said first apparatus is adapted to inhibit initiating said A/D conversion operations, irrespective of whether a request command is received from said second apparatus, during an interval that extends from a commencement of an execution of said compensation coefficient updating operation by said compensation value calculation means until completion of said operation.

13. A knock sensor signal processing apparatus according to claim 1, comprising a first apparatus and a second apparatus in combination, wherein said first apparatus incorporates said A/D converter, said A/D converter control means, said compensation value calculation means and said compensation means, and said second apparatus incorporates said digital filter;
wherein said first apparatus is adapted to initiate a plurality of successive knock sensor signal A/D conversion operations at fixed periodic intervals and to supply resultant A/D values of said knock sensor signal to said second apparatus, in response to a request command transmitted from said second apparatus, and said compensation value calculation means of said first apparatus is adapted to interrupt an execution of said compensation coefficient updating operation when said request command is received from said second apparatus during said execution, with said A/D converter control means then initiating said successive A/D conversion operations to derive successive knock sensor signal A/D values at fixed periodic intervals, and with said compensation means applying compensation to each of said knock sensor signal A/D values by utilizing a compensation coefficient that has been derived in a precedingly completed execution of said compensation coefficient updating operation.

14. A knock sensor signal processing apparatus according to claim 1, comprising an amplifier for operating on an analog signal and supplying a resultant output analog signal as an input analog signal to said A/D converter, said amplifier having a gain of value M, where M is a positive integer, wherein said amplifier amplifies a difference between said analog signal and a predetermined fixed voltage that is different from a zero voltage value as measured with respect to said reference voltage, and wherein said compensation value calculation means is adapted to obtain said A/D value of said reference voltage by inputting to said amplifier a voltage that is determined in accordance with a combination of said reference voltage, said gain value M and said predetermined fixed voltage, for producing a logical A/D value of said reference voltage from said A/D converter.

15. A knock sensor signal processing apparatus according to claim 14, wherein said predetermined fixed voltage is a central voltage of said knock sensor signal.

16. A knock sensor signal processing apparatus according to claim 1, comprising a first apparatus and a second apparatus in combination, with said first apparatus incorporating said A/D converter, said A/D converter control means, said compensation value calculation means, said compensation means and an amplifier for operating on an analog signal and supplying a resultant output analog signal as an input analog signal to said A/D converter, and a multiplexer coupled to receive a plurality of analog signals via respective channels and operable for selecting a designated one of said channels and supplying a corresponding one of said analog signals as an input signal to said amplifier, and with said second apparatus incorporating said digital filter;

wherein said second apparatus is adapted to transmit to said first apparatus a command for designating at least one of a gain value that is to be set for said amplifier and a one of said channels that is to be selected by said multiplexer.

17. A knock sensor signal processing apparatus according to claim 1, wherein said compensation value calculation means is adapted to execute each of said compensation coefficient updating operations by successively deriving a plurality of A/D values of said reference voltage from said A/D converter, calculating an average value of said plurality of A/D values, and applying said average value in said calculation of an updated compensation coefficient.

18. A knock sensor signal processing apparatus according to claim 1, wherein said compensation means is adapted to calculate an average value of a plurality of successively derived ones of said compensation coefficients, and to apply said average value in compensating each of a plurality of successive knock sensor A/D values.

19. A knock sensor signal processing apparatus according to claim 1, comprising a resistive voltage divider coupled to a fixed DC voltage, for producing a stepped-down voltage, a buffer circuit coupled to receive said stepped-down voltage as an input voltage, and circuitry adapted to set an output voltage from said buffer circuit as a central voltage value of said knock sensor signal, prior to inputting said knock sensor signal to said A/D converter;

wherein said buffer circuit output voltage is converted to an A/D value by said A/D converter and said A/D value of said buffer circuit output voltage is subtracted from each of said A/D values of said knock sensor signal produced from said A/D converter, said compensation coefficient is applied by said control means to compensate each of respective knock sensor signal A/D value resulting from said subtraction operation, to obtain compensated knock sensor signal A/D values, and said compensated knock sensor signal A/D values are subjected to said digital filter processing by said digital filter.

* * * * *